(12) United States Patent
Foody

(10) Patent No.: US 12,264,068 B2
(45) Date of Patent: Apr. 1, 2025

(54) METHOD FOR MAKING LOW CARBON INTENSITY HYDROGEN

(71) Applicant: Iogen Corporation, Ottawa (CA)

(72) Inventor: Brian Foody, Ottawa (CA)

(73) Assignee: Iogen Corporation, Ottawa (CA)

( * ) Notice: Subject to any disclaimer, the term of this patent is extended or adjusted under 35 U.S.C. 154(b) by 0 days.

(21) Appl. No.: 18/413,978

(22) Filed: Jan. 16, 2024

(65) Prior Publication Data

US 2024/0336478 A1 Oct. 10, 2024

Related U.S. Application Data

(60) Provisional application No. 63/494,168, filed on Apr. 4, 2023.

(51) Int. Cl.
*C01B 3/38* (2006.01)
*C01B 3/48* (2006.01)

(52) U.S. Cl.
CPC .......... *C01B 3/382* (2013.01); *C01B 3/48* (2013.01); *C01B 2203/0244* (2013.01);
(Continued)

(58) Field of Classification Search
CPC ... C01B 3/382; C01B 3/48; C01B 2203/0244; C01B 2203/0283; C01B 2203/085; C01B 2203/1241; C01B 2203/86
See application file for complete search history.

(56) References Cited

U.S. PATENT DOCUMENTS 3,105,811 A 10/1963 Engel
4,372,856 A 2/1983 Morrison
(Continued)

FOREIGN PATENT DOCUMENTS

AU 2020100873 7/2020
AU 2021102128 9/2021
(Continued)

OTHER PUBLICATIONS

Office Action for U.S. Appl. No. 18/600,023 dated May 22, 2024.
(Continued)

*Primary Examiner* — Wayne A Langel
*Assistant Examiner* — Syed T Iqbal
(74) *Attorney, Agent, or Firm* — Knobbe Martens Olson & Bear LLP

(57) ABSTRACT

Provided herein is process of obtaining hydrogen from a blue hydrogen production facility that meets a target carbon intensity ($CI_T$), the process comprising: generating hydrogen from non-renewable feedstock; capturing and sequestering fossil $CO_2$ derived from the non-renewable feedstock; and at least partially powering hydrogen production with renewable electricity, the renewable electricity being derived from biomass in which biogenic carbon produced therefrom (e.g., carbon dioxide, char and the like) is captured and sequestered; and wherein the use of the renewable electricity in the hydrogen production allows the carbon intensity of the hydrogen produced therefrom to be reduced sufficiently so that the target carbon intensity ($CI_T$) is achieved.

16 Claims, 6 Drawing Sheets

(52) U.S. Cl.
CPC .................... C01B 2203/0283 (2013.01); C01B 2203/085 (2013.01); C01B 2203/1241 (2013.01); C01B 2203/86 (2013.01)

(56) References Cited

U.S. PATENT DOCUMENTS

| | | |
|---|---|---|
| 6,503,298 B1 | 1/2003 | Monzyk et al. |
| 7,014,768 B2 | 3/2006 | Li et al. |
| 7,332,146 B1 | 2/2008 | Huang et al. |
| RE40,419 E | 7/2008 | Norbeck et al. |
| 7,691,182 B1 | 4/2010 | Muradov et al. |
| 7,753,972 B2 | 7/2010 | Zubrin et al. |
| 7,794,690 B2 | 9/2010 | Abatzoglou et al. |
| 7,931,888 B2 | 4/2011 | Drnevich et al. |
| 7,937,948 B2 | 5/2011 | Zubrin et al. |
| 7,951,296 B2 | 5/2011 | Williams |
| 7,972,082 B2 | 7/2011 | Augenstein et al. |
| 8,021,464 B2 | 9/2011 | Gauthier et al. |
| 8,057,773 B2 | 11/2011 | MacArthur et al. |
| 8,137,422 B2 | 3/2012 | Licht et al. |
| 8,268,044 B2 | 9/2012 | Wright et al. |
| 8,318,130 B2 | 11/2012 | Grimes et al. |
| 8,460,630 B2 | 6/2013 | Niitsuma et al. |
| 8,470,567 B2 | 6/2013 | Facey et al. |
| 8,475,566 B2 | 7/2013 | Find |
| 8,496,908 B1 | 7/2013 | Genkin et al. |
| 8,629,188 B2 | 1/2014 | Ravikumar et al. |
| 8,658,026 B2 | 2/2014 | Foody et al. |
| 8,673,056 B2 | 3/2014 | De Bas et al. |
| 8,673,135 B2 | 3/2014 | Colyar et al. |
| 8,679,439 B2 | 3/2014 | Randhava et al. |
| 8,753,854 B2 | 6/2014 | Foody |
| 8,852,456 B2 | 10/2014 | Valentin et al. |
| 8,900,546 B2 | 12/2014 | Van De Graaf et al. |
| 8,916,735 B2 | 12/2014 | McAlister |
| 8,945,373 B2 | 2/2015 | Foody |
| 8,974,669 B2 | 3/2015 | Del Porto |
| 8,980,211 B2 | 3/2015 | Timmins |
| 8,987,175 B2 | 3/2015 | Van Den Berg et al. |
| 9,028,794 B2 | 5/2015 | Darde et al. |
| 9,038,435 B2 | 5/2015 | Wang |
| 9,040,271 B2 | 5/2015 | Foody |
| 9,045,337 B2 | 6/2015 | Kuku |
| 9,108,894 B1 | 8/2015 | Foody et al. |
| 9,163,180 B2 | 10/2015 | Marion et al. |
| 9,163,188 B2 | 10/2015 | Forsyth et al. |
| 9,381,493 B2 | 7/2016 | Kirk et al. |
| 9,506,605 B2 | 11/2016 | Paget et al. |
| 9,701,535 B2 | 7/2017 | Iaquaniello et al. |
| 9,816,035 B2 | 11/2017 | Lehoux et al. |
| 9,963,665 B2 | 5/2018 | Feldmann |
| 10,093,540 B2 | 10/2018 | Foody |
| 10,106,746 B2 | 10/2018 | Boon et al. |
| 10,228,131 B2 | 3/2019 | Merritt, Jr. |
| 10,302,357 B2 | 5/2019 | Hernandez et al. |
| 10,414,649 B2 | 9/2019 | Denton et al. |
| 10,421,663 B2 | 9/2019 | Foody |
| 10,557,338 B2 | 2/2020 | Rhodes et al. |
| 10,577,248 B2 | 3/2020 | Haper, Jr. |
| 10,627,158 B2 | 4/2020 | Repasky et al. |
| 10,640,793 B2 | 5/2020 | Foody et al. |
| 10,723,621 B2 | 7/2020 | Foody |
| 10,760,024 B2 | 9/2020 | Foody et al. |
| 10,894,968 B2 | 1/2021 | Foody et al. |
| 10,927,008 B2 | 2/2021 | Raaheim et al. |
| 10,981,784 B2 | 4/2021 | Foody |
| 11,168,339 B1 | 9/2021 | Stepany et al. |
| 11,204,271 B2 | 12/2021 | Williams et al. |
| 11,293,035 B2 | 4/2022 | Ludtke et al. |
| 11,299,686 B2 | 4/2022 | Foody et al. |
| 11,402,068 B2 | 8/2022 | Himschoot et al. |
| 11,434,509 B2 | 9/2022 | Foody et al. |
| 11,760,630 B2 | 9/2023 | Foody |
| 11,807,530 B2 | 11/2023 | Foody |
| 11,827,916 B2 | 11/2023 | Foody et al. |
| 11,946,001 B2 | 4/2024 | Foody |
| 11,946,006 B2 | 4/2024 | Foody et al. |
| 11,952,272 B1 | 4/2024 | Best, III et al. |
| 11,952,274 B1 | 4/2024 | Best, III et al. |
| 11,952,276 B1 | 4/2024 | Best, III et al. |
| 12,017,913 B1 | 6/2024 | Miller et al. |
| 2003/0111410 A1 | 6/2003 | Branson |
| 2004/0111968 A1 | 6/2004 | Day et al. |
| 2006/0207178 A1 | 9/2006 | Hsu |
| 2007/0062216 A1 | 3/2007 | Mak et al. |
| 2007/0295593 A1 | 12/2007 | Martinez |
| 2008/0159938 A1 | 7/2008 | Mauthner et al. |
| 2008/0262701 A1 | 10/2008 | Williams et al. |
| 2008/0280338 A1 | 11/2008 | Hall et al. |
| 2009/0162914 A1 | 6/2009 | Offerman et al. |
| 2009/0255181 A1 | 10/2009 | Rhinesmith et al. |
| 2010/0015680 A1 | 1/2010 | Van Groenestijn et al. |
| 2010/0047160 A1 | 2/2010 | Allam |
| 2010/0071429 A1 | 3/2010 | Von Nordenskjold |
| 2010/0076238 A1 | 3/2010 | Brandvold et al. |
| 2010/0158792 A1 | 6/2010 | Drnevich et al. |
| 2010/0205863 A1 | 8/2010 | Biollaz et al. |
| 2010/0228067 A1 | 9/2010 | Peterson et al. |
| 2010/0297749 A1 | 11/2010 | Aravanis et al. |
| 2011/0020862 A1 | 1/2011 | Audebert et al. |
| 2011/0113779 A1* | 5/2011 | Polvi .............. F01K 23/062 60/657 |
| 2011/0158858 A1 | 6/2011 | Alves Ramalho Gomes |
| 2011/0175032 A1 | 7/2011 | Gunther |
| 2011/0226997 A1 | 9/2011 | Goruney et al. |
| 2011/0229404 A1 | 9/2011 | Guo et al. |
| 2011/0305627 A1 | 12/2011 | Gupta et al. |
| 2012/0058045 A1 | 3/2012 | Beckman et al. |
| 2012/0165581 A1 | 6/2012 | Dupassieux et al. |
| 2012/0232173 A1* | 9/2012 | Juranitch .............. C10J 3/18 422/600 |
| 2012/0270119 A1 | 10/2012 | Raaheim et al. |
| 2012/0291351 A1 | 11/2012 | Bool et al. |
| 2013/0023707 A1 | 1/2013 | Keefer et al. |
| 2013/0097929 A1 | 4/2013 | Pham et al. |
| 2013/0161235 A1 | 6/2013 | Foody |
| 2013/0164806 A1 | 6/2013 | Foody |
| 2013/0345325 A1 | 12/2013 | Lecomte et al. |
| 2014/0023975 A1 | 1/2014 | Paul et al. |
| 2014/0186258 A1 | 7/2014 | Allidieres |
| 2014/0360485 A1 | 12/2014 | Saxena |
| 2015/0038599 A1 | 2/2015 | Kresnyak |
| 2015/0118723 A1 | 4/2015 | Duzoglou |
| 2015/0133701 A1 | 5/2015 | Townsend et al. |
| 2015/0225233 A1 | 8/2015 | Foody |
| 2015/0376801 A1 | 12/2015 | Bairamijamal |
| 2016/0060537 A1 | 3/2016 | Hsu |
| 2016/0264418 A1 | 9/2016 | Leclerc et al. |
| 2017/0001142 A1 | 1/2017 | Rayner et al. |
| 2017/0022424 A1 | 1/2017 | Chapus et al. |
| 2017/0051318 A1 | 2/2017 | Hakalehto |
| 2017/0073227 A1 | 3/2017 | Dybkjaer et al. |
| 2017/0130582 A1* | 5/2017 | Hsu ..................... C10K 1/04 |
| 2017/0152453 A1 | 6/2017 | Goerz |
| 2017/0158503 A1 | 6/2017 | Foody et al. |
| 2018/0079672 A1 | 3/2018 | Meyer |
| 2018/0251694 A1 | 9/2018 | Foody et al. |
| 2018/0291278 A1 | 10/2018 | Jack et al. |
| 2019/0352177 A1 | 11/2019 | Denton et al. |
| 2019/0359894 A1 | 11/2019 | Heidel et al. |
| 2020/0078728 A1 | 3/2020 | Iaquaniello et al. |
| 2020/0087576 A1 | 3/2020 | Marker et al. |
| 2020/0096254 A1 | 3/2020 | Cardon et al. |
| 2020/0115664 A1 | 4/2020 | Camacho et al. |
| 2020/0148964 A1 | 5/2020 | Foody et al. |
| 2020/0222874 A1 | 7/2020 | Manenti |
| 2020/0283920 A1 | 9/2020 | Bairamijamal |
| 2020/0307997 A1 | 10/2020 | Tranier |
| 2021/0078888 A1 | 3/2021 | Kanu |
| 2021/0140054 A1 | 5/2021 | Park et al. |
| 2021/0155864 A1 | 5/2021 | Foody et al. |
| 2021/0221679 A1 | 7/2021 | Foody |
| 2021/0275961 A1 | 9/2021 | Foody et al. |
| 2021/0285017 A1 | 9/2021 | Feldmann et al. |

(56) References Cited

U.S. PATENT DOCUMENTS

| | | |
|---|---|---|
| 2021/0317377 A1 | 10/2021 | Foody et al. |
| 2021/0324282 A1 | 10/2021 | Foody et al. |
| 2022/0042406 A1 | 2/2022 | Whikehart et al. |
| 2022/0119269 A1 | 4/2022 | Huckman et al. |
| 2022/0127211 A1 | 4/2022 | Whitmore |
| 2022/0134298 A1 | 5/2022 | Marker et al. |
| 2022/0177792 A1 | 6/2022 | Foody et al. |
| 2022/0213511 A1 | 7/2022 | Mann et al. |
| 2022/0267147 A1 | 8/2022 | Ravikumar et al. |
| 2022/0411264 A1* | 12/2022 | Do .......................... C09C 1/54 |
| 2023/0053930 A1 | 2/2023 | Foody et al. |
| 2023/0271866 A1 | 8/2023 | Sallustro |
| 2023/0295523 A1 | 9/2023 | Foody |
| 2023/0374394 A1 | 11/2023 | Foody |
| 2024/0025737 A1 | 1/2024 | Foody |
| 2024/0025739 A1 | 1/2024 | Foody |
| 2024/0117285 A1 | 4/2024 | Kulkarni et al. |
| 2024/0209272 A1 | 6/2024 | Foody et al. |
| 2024/0263081 A1 | 8/2024 | Foody et al. |

FOREIGN PATENT DOCUMENTS

| | | |
|---|---|---|
| CA | 2739420 | 9/2011 |
| CA | 3039567 | 4/2018 |
| CN | 110776941 | 2/2020 |
| CN | 113353886 | 9/2021 |
| DE | 10 2013 011 289 | 1/2015 |
| EP | 2 386 621 | 11/2011 |
| EP | 2 616 530 | 4/2012 |
| EP | 2 724 081 | 12/2012 |
| EP | 2 944 606 | 11/2015 |
| EP | 3 085 766 | 10/2016 |
| EP | 2 547 619 | 10/2017 |
| EP | 3 484 811 | 1/2018 |
| EP | 3 795 537 | 3/2021 |
| EP | 4 043 089 | 8/2022 |
| ES | 2490066 | 9/2014 |
| FR | 2978961 | 2/2013 |
| GB | 2 466 554 | 6/2010 |
| GB | 2 585 987 | 11/2021 |
| GB | 2 589 198 | 11/2021 |
| GB | 2 596 675 | 1/2022 |
| GB | 2 592 531 | 4/2022 |
| RU | 2 711 634 | 1/2020 |
| WO | WO 2003/051803 | 6/2003 |
| WO | WO 2008/044929 | 4/2008 |
| WO | WO 2008/109122 | 9/2008 |
| WO | WO 2009/126379 | 10/2009 |
| WO | WO 2010/047815 | 4/2010 |
| WO | WO 2010/051622 | 5/2010 |
| WO | WO 2010/080407 | 7/2010 |
| WO | WO 2010/124030 | 10/2010 |
| WO | WO 2011/092136 | 8/2011 |
| WO | WO 2011/101137 | 8/2011 |
| WO | WO 2012/093041 | 7/2012 |
| WO | WO 2012/151545 | 11/2012 |
| WO | WO 2013/029171 | 3/2013 |
| WO | WO 2013/131916 | 9/2013 |
| WO | WO 2014/014803 | 1/2014 |
| WO | WO 2015/010201 | 1/2015 |
| WO | WO 2015/042315 | 3/2015 |
| WO | WO 2016/101076 | 6/2016 |
| WO | WO 2018/187716 | 10/2018 |
| WO | WO 2019/129858 | 7/2019 |
| WO | WO 2019/185315 | 10/2019 |
| WO | WO 2019/229798 | 12/2019 |
| WO | WO 2020/010430 | 1/2020 |
| WO | WO 2021/003564 | 1/2021 |
| WO | WO 2021/035352 | 3/2021 |
| WO | WO 2021/035353 | 3/2021 |
| WO | WO 2021/062397 | 4/2021 |
| WO | WO 2021/110757 | 6/2021 |
| WO | WO 2021/110810 | 6/2021 |
| WO | WO 2021/110811 | 6/2021 |
| WO | WO 2021/142528 | 7/2021 |
| WO | WO 2021/175662 | 9/2021 |
| WO | WO 2021/180805 | 9/2021 |
| WO | WO 2021/189137 | 9/2021 |
| WO | WO 2021/203176 | 10/2021 |
| WO | WO 2021/217269 | 11/2021 |
| WO | WO 2022/193007 | 9/2022 |
| WO | WO 2022/217365 | 10/2022 |
| WO | WO 2022/221954 | 10/2022 |
| WO | WO 2022/229838 | 11/2022 |
| WO | WO 2022/246546 | 12/2022 |
| WO | WO 2022/253460 | 12/2022 |
| WO | WO 2023/283721 | 1/2023 |
| WO | WO 2023/049993 | 4/2023 |
| WO | WO 2023/049994 | 4/2023 |
| WO | WO 2023/092138 | 5/2023 |
| WO | WO 2023/097403 | 6/2023 |
| WO | WO 2023/097404 | 6/2023 |
| WO | WO 2023/197064 | 10/2023 |
| WO | WO 2023/197065 | 10/2023 |
| WO | WO 2023/197066 | 10/2023 |

OTHER PUBLICATIONS

R&D Greet® Model—The Greenhouse Gases, Regulated Emissions, and Energy use in Technologies Model, Argonne National Laboratory, webpage accessed Feb. 5, 2024. URL: https://greet.anl.gov/.

"An Introduction to Petroleum Refining and the Production of Ultra Low Sulfur Gasoline and Diesel Fuel", MathPro, Oct. 2011 (Access Date: Aug. 13, 2020), in 38 pages. URL: https://theicct.org/sites/default/files/publications/ICCT05_Refining_Tutorial_FINAL_R1.pdf.

"Biomass with CO2 Capture and Storage (Bio-CCS) The Way Forward for Europe", European Technology Platform for Zero Emission Fossil Fuel Power Plants (2012).

"Blue Hydrogen—Groundbreaking Solutions for Hydrogen Production at Scale", Topsoe A/S, Denmark, (2022) 11 pages.

"Clarification on Compliance with CertifHy Green Hydrogen Criteria for FCH JU Projects", www.fch.europa.eu Access date Jul. 27, 2022.

"Clean and Renewable Energy from Pulp Mill Waste Using Microsludge and Anaerobic Digestion", Paradigm Environmental Technologies Inc., 2011, pp. 1-2.

Definition of "Crude Oil", Random House Unabridged Dictionary, 2nd Ed., New York, 1993.

Guidance for the Certification of Co-Processing, ISCC System GmbH, 2017, Version 1.1, Access date: Aug. 7, 2020, in 8 pages. URL: https://www.iscc-system.org/wp-content/uploads/2017/02/ISCC-Guidance-Document-203-01_Co-processing-requirements.pdf.

"Hydrogen in a Low-Carbon Economy", Committee on Climate Change, Nov. 2018.

"Hydrogen Strategy for Canada Seizing the Opportunities for Hydrogen" Access date Jan. 27, 2022.

"Natural Gas Processing: The Crucial Link Between Natural Gas Production and Its Transportation to Market", Energy Information Administration, Office of Oil and Gas, Jan. 2006, pp. 1-11.

"Part II—Environmental Protection Agency—40 CFR Part 80 Regulation of Fuels and Fuel Additives: Changes to Renewable Fuel Standard Program; Final Rule", Federal Register, vol. 75(58), Mar. 26, 2010, in 236 pages. URL: https://www.gpo.gov/fdsys/pkg/FR-2010-03-26/pdf/2010-3851.pdf.

"RTFO Guidance Part One Process Guidance", Department for Transport, version 11.0, Apr. 2018, in 75 pages.

"RTFO Guidance Part One Process Guidance", Department for Transport, version Jan. 2020, used for reporting under the Renewable Transport Fuel Obligations Order 2007 No. 3072, in 71 pages.

"The potential role of blue hydrogen in low-carbon energy markets in the US", American Petroleum Institute (API), dated Oct. 12, 2022, in 160 pages.

"The Role of Biogas & RNG in Hydrogen Production & Decarbonization", BayoTech (2020).

Transportation Fuels from Biomass via IH$^2$ Technology, IEA Bioenergy Conference, Nov. 2012, pp. 1-25.

(56) References Cited

OTHER PUBLICATIONS

"Zero Carbon Hydrogen—Is it Achievable?" https://www.wsp.com/en-GB/insights/zero-carbon-hydrogen-is-it-ievable#:~:text=By%20balancing%20hydrogen%20production%20between,for%20the%20decarbonisation%20of%20heat. Access date: Mar. 5, 2021.

EPA, 2008b. *Clean Energy Strategies for Local Governments, 7.4: Landfill Methane Utilization*, Draft. Landfill Methane Outreach Program (LMOP), Climate Change Division, U.S. Epa. Dec. 10, 2008, in 34 pages. URL: https://www.epa.gov/sites/production/files/2015-12/documents/landfills.pdf.

Adair, Blake, "Ammonia: Transitioning to Net-Zero Future", Nutrien (2022).

Al-Qahtani, et al., "Uncovering the True Cost of Hydrogen Production Routes Using Life Cycle Monetisation", Applied Energy 281 (2021) 15958.

Alves et al., "Overview of Hydrogen Production Technologies from Biogas and the Applications in Fuel Cells", International Journal of Hydrogen Energy (2010) 1-11.

Ambrosetti et al., "A Numerical Investigation of Electrically-Heated Methane Steam Reforming Over Structured Catalysts", Frontiers in Chemical Engineering, 3 (2021) 747636.

Antonini et al., "Biomass to Hydrogen with CCS: can we go negative", https://www.sintef.no/globalassets/project/elegancy/documents/webinar3a/04-elegancy-final-presentation-ca-v2.pdf, Access date: Nov. 7, 2022.

Antonini et al., "Hydrogen Production from Natural Gas and Biomethane with Carbon Capture and Storage—A Techno-Environmental Analysis", Sustainable Energy Fuels, 4 (2020) 2967.

Arora et al. "Small-scale Ammonia Production from Biomass: A Techno-enviro-economic perspective." Industrial & Engineering Chemistry Research 55.22 (2016) 6422-6434.

Baker et al., "Hydrolysis of Cellulose Using Ternary Mixtures of Purified Cellulases," Applied Chemistry and Biotechnology, 1998, vol. 70-72, pp. 395-403.

Boerrigter, "Green gas (SNG) in the Dutch Energy Infrastructure," Energy Research Centre of the Netherlands, ECN-RX-06-072, Mar. 30, 2006, pp. 1-11.

Boland, S., et al., "GHG Emissions Reductions due to the RFS2", Life Cycle Associates, 2015, pp. 1-14.

Borjesson et al., "Biogas as a resource-efficient vehicle fuel", Trends in Biotechnology, 2007, vol. 26, Issue 1, pp. 7-13.

Brau et al., "Hydrogen for Oil Refining via Biomass Indirect Steam Gasification: Energy and Environmental Targets", Clean Techn. Environ. Policy (2013) 15, 501-512.

Brau Jean-Florian., "Production of Hydrogen for Oil Refining by Thermal Gasification of Biomass: Process Design, Integration and Evaluation", Thesis (2013) Chambers University of Technology, Sweden.

British Columbia BCBN Hydrogen Study Final Report https://www2.gov.bc.ca/assets/gov/government/ministries-organizations/zen-bcbn-hydrogen-study-final-v6.pdf, Access Date: Apr. 4, 2021.

Brown, Trevor. "Renewable Hydrogen for Sustainable Ammonia Production." Chemical Engineering Progress 115.8 (2019) 47-53.

California Executive Order S-01-07, Office of the Governor, Signed Jan. 18, 2007, in 2 pages.

Clean Energy Strategies for Local Governments, 7.4 Landfill Methane Utilization, Dec. 10, 2008, pp. 1-34.

Cloete et al., "System-friendly process design: Optimizing blue hydrogen production for future energy systems", Energy 259, Nov. 2022, 124954.

Carbolea, Animal Manures, Accessed Nov. 22, 2017, in 6 pages. URL: www.carbolea.ul.ie/manures.php.

Collins, Leigh, "New Clean Hydrogen Production Tax Credit of up to $3/Kg Approved by US House, Paving Way for Cheap Green H2" Access date Jul. 26, 2022.

Cortright et al., "Hydrogen from catalytic reforming of biomass-derived hydrocarbons in liquid water", Nature, Aug. 2002, vol. 418, pp. 964-967.

Cruz et al., "Exergy Analysis of Hydrogen Production via Biogas Dry Reforming", International Journal of Hydrogen Energy, V 43, I 26, (2018) 11688-11695.

Cruz et al., "Petroleum Refinery Hydrogen Production Unit: Exergy [sic] and Production Cost Evaluation", International Journal of Thermodynamics, Dec. 2008, vol. 11, No. 4, pp. 187-193.

Denholm et al., "Examining supply-side options to achieve 100% clean electricity by 2035", Golden, CO: National Renewable Energy Laboratory, 2022, NREL/TP-6A40-81644, in 161 pages.

Dinca, et al., "CO2 Capture from Syngas Generated by a Biomass Gasification Power Plant with Chemical Absorption Process", Energy (2018).

Energy Independence and Security Act of 2007, United States Cong. Energy Independence and Security Act of 2007, 110th Cong., Pub. L. 110-140, Enacted Dec. 19, 2007, in 310 pages.

EPA, An Overview of Renewable Natural Gas from Biogas, Jul. 2020.

"Keeping on Pace for Net Zero: Delegated Act to specify the methodology to determine the share of biofuels and biogas used in transport resulting from biomass being processed with fossil fuels in a common process", Feedback from: logen Corporation in response to European Commission, "Renewable energy—Method for Calculating the Share of Renewables in the Case of Co-processing", Feedback reference F3325697 submitted on Jul. 20, 2022, https://ec.europa.eu/info/law/better-regulation/have-your-say/initiatives/12711-Renewable-energy-method-for-calculating-the-share-of-renewables-in-the-case-of-co-processing/F3325697_en, Access Date: Oct. 26, 2022, in 4 pages.

Ewing et al., "Hydrogen on the Path to Net Zero—Costs and Climate Benefits", Pembina institute, Jul. 2020.

Ferreira-Aparicio et al., "New Trends in Reforming Technologies: from Hydrogen Industrial Plants to Multifuel Microreformers", Catalysis Reviews, 2005, vol. 47, pp. 491-588.

Final Assessment Report "Landfill Biogas Recovery and Utilization at the Santo Andre Municipal Sanitary Landfill Santo Andre, Brazil", Prepared under U.S. Environmental Protection Agency Landfill Methane Outreach Program, Sep. 2008, pp. 1-31.

Full et al., A New Perspective for Climate Change Mitigation—Introducing Carbon-Negative Hydrogen Production from Biomass with Carbon Capture and Storage (HYBECCS), Sustainability (2021) 13 4026.

Geissler et al., "Analysis of alternative bioenergy with carbon capture strategies: present and future," Energy & Environmental Science, 2022, vol. 15, pp. 2679-2689.

Gencer, Emre, et al. "Sustainable Production of Ammonia Fertilizers from Biomass." Biofuels, Bioproducts and Biorefining 14.4 (2020) 725-733.

Ghavam et al. "Sustainable Ammonia Production Processes." Frontiers in Energy Research 9 (2021) 34.

Gruia, Practical Advances in Petroleum Processing, vol. 1, Ed. by Chang S. Hsu and Paul R. Robinson, Springer, New York, Chapter 8, "Recent Advances in Hydrocracking", 2006, pp. 219-255.

Hakawati et al., "What is the most energy efficient route for biogas utilization: Heat, electricity or transport?", Applied Energy, Nov. 2017, vol. 206, pp. 1076-1087.

Hanson, P., "Increasing Renewable Content with the Mass Balance Approach", NNFCC, Mar. 2019 (Access date: Jan. 18, 2022), in 3 pages. URL: https://www.nnfcc.co.uk/files/mydocs/Mass%20Balance.pdf.

Hengeveld et al., "When does decentralized production of biogas and centralized upgrading and|injection into the natural gas grid make sense?", Biomass and Bioenergy, Jun. 2014, vol. 67, pp. 363-371.

Hidalgo, Maria, "Biomethane and Biohydrogen: the Future of Energy is Here", CARTIF Blog, Energy and Environment, Mar. 22, 2021, Access Date: Feb. 17, 2022.

Hovland, J. et al., "Compression of raw biogas—A feasibility study", Tel-Tek, Apr. 2017, Report No. 2217020-1, in 12 pages.

Howorth et al., "How Green is Blue Hydrogen", Energy Sci. Eng. (2021) 9 1676-1687.

IEAGHG Technical Review 2017-TR2, Feb. 2017. Techno-Economic Evaluation of SMR Based Standalone (Merchant) Hydro-

(56) References Cited

OTHER PUBLICATIONS gen Plant with CCS, in 286 pages. URL: https://ieaghg.org/exco_docs/2017-02.pdf. (This document uploaded in two parts).
IEAGHG Technical Review 2017-TR3, Mar. 2017. Reference data and Supporting Literature Reviews for SMR based Hydrogen Production with CCS, in 131 pages. URL: https://ieaghg.org/publications/technical-reports/reports-list/10-technical-reviews/778-2017-tr3-reference-data-supporting-literature-reviews-for-smr-based-hydrogen-production-with-ccs. (This document uploaded in three parts).
Jechura, J., "Hydroprocessing: Hydrotreating & Hydrocracking—Chapters 7 & 9", Colorado School of Mines, updated Jul. 12, 2018, in 56 pages. URL: https://inside.mines.edu/~jjechura/Refining/08_Hydroprocessing.pdf.
Jesper et al. "Bio-SNG Potential Assessment: Denmark 2020," Riso National Laboratory for Sustainable Energy, Riso-R-1754, Nov. 2010, pp. 1-85.
Krich et al., Biomethane from Dairy Waste, "A Sourcebook for the Production and Use of Renewable Natural Gas in California", Jul. 2005, pp. 66-67 and pp. 81-106.
Kurokawa et al., "Energy-Efficient Distributed Carbon Capture in Hydrogen Production from Natural Gas", Energy Procedia 4 (2011) 674-680.
Latvala "Using Biogas in the Production of Liquid Transport Fuels as Hydrogen Source", Second Nordic Biogas Conference, Malmo, Sweden, 2008, pp. 1-13.
Lewis et al., "Comparison of commercial, state-of-the-art, fossil-based hydrogen production technologies," National Energy Technology Laboratory, dated Apr. 12, 2022, DOE/NETL-2022/3241, in 327 pages.
Marcoberardino et al., "Green Hydrogen Production from Raw Biogas: A Techno-Economic Investigation of Conventional Processes Using Pressure Swing Adsorption Unit", Processes 6 (2018) 19.
McPhail et al., The Renewable Identification System and U.S. Biofuel Mandates, USDA, BIO-03, Nov. 2011, in 24 pages.
Mezei, "Options for Upgrading Digester Biogas to Pipeline Quality", Flotech Services, Apr. 2010, pp. 1-15.
Milbrandt et al., "Biogas and Hydrogen Systems Market Assessment", National Renewable Energy Laboratory (NREL). Technical Report NREL/TP-6A20-63596, Mar. 2016.
Milne et al., "Hydrogen from Biomass State of the Art and Research Challenges", National Renewable Energy Laboratory, A Report for the International Energy Agency Agreement on the Production and Utilization of Hydrogen Task 16, Hydrogen from Carbon-Containing Materials, 2002, pp. 1-78.
Mozaffarian et al. "Green Gas (SNG) Production by Supercritical Gasification of Biomass," Energy Research Centre of the Netherlands, ENC-C-04-081, Nov. 2004, pp. 1-71.
Muradov et al., "Hydrogen production by catalytic processing of renewable methane-rich gases", Int. J. of Hydrogen Energy, 2008, vol. 33, pp. 2023-2035.
Najafpour et al., "Hydrogen as clean fuel via continuous fermentation by anaerobic photosynthetic bacteria, *Rhodospirillum rubrum*", African Journal of Biotechnology, Oct. 2004, vol. 3, Issue 10, pp. 503-507.
Naqvi, Syed, "Hydrogen Production", PEP Report 32C, SRI Consulting (2007).
Ni, et al., "An Overview of Hydrogen Production from Biomass", Fuel Processing Technology 87 (2006) 461-472.
Oni et al., "Comparative Assessment of Blue Hydrogen from Steam Methane Reforming, Autothermal Reforming, and Natural Gas Decomposition Technologies for natural gas-producing regions", Energy Conversion and Management 254 (2022) 115245.
Parkinson et al., "Hydrogen Production using Methane: Techno-Economics of Decarbonizing Fuels and Chemicals", International Journal of Hydrogen Energy, 43 (2018) 2540.
Prospects for Hydrogen from Biomass, IEA Hydrogen Implementing Agreement, Annex 16, Subtask B, Final Report, Jun. 2006, pp. 1-69.
Rapier, Robert "Estimating the Carbon Footprint of Hydrogen Production", Forbes, Jun. 6, 2020.
Rau et al., "Production of Hydrogen by Autothermal Reforming of Biogas", Energy Procedia 120 (2017) 294-301.
Regalbuto, "An NSF Perspective on Next Generation Hydrocarbon Biorefineries", Computers and Chemical Engineering, 2010, vol. 34, pp. 1393-1396.
Robinson et al., Practical Advances in Petroleum Processing, vol. 1, Ed. by Chang S. Hsu and Paul R. Robinson, Springer, New York, Chapter 7, "Hydrotreating and Hydrocracking: Fundamentals", 2006, pp. 177-218.
Rosa et al., "Potential for hydrogen production from sustainable biomass with carbon capture and storage", Renewable and Sustainable Energy Reviews, Apr. 2022, vol. 157, 112123.
Salary, et al., "Design of Oil Refineries Hydrogen Network Using Process Integration Principles", Iran. J. Chem. Chem. Eng., 2008, vol. 27, No. 4, pp. 49-64.
Sanchez et al., "Biomass Based Sustainable Ammonia Production", 2019 AIChE Annual Meeting. AIChE, 2019.
Santos, Stanley, "Understanding the Potential of CCS in Hydrogen Production", Process Industry CCS Workshop (2015).
Schanbacher, "Anaerobic Digestion: Overview and Opportunities", Waste to Energy Workshop: Advances and Opportunities for Ohio's Livestock and Food Processing Industries, OARDC, Apr. 7, 2009, pp. 1-28.
Schill, Susanne, "Iowa to Get First Biomass-to-Ammonia Plant", https://biomassmagazine.com/articles/2613/iowa-to-get-first-biomass-to-ammonia-lant/#:~:text=SynGest%20Inc.%20has%20secured%20a,deploy%20in%20its%20first%20plant., Access date: Feb. 17, 2022.
Shiga et al., "Large-Scale Hydrogen Production from Biogas", International Journal of Hydrogen Energy, 1998, vol. 23, No. 8, pp. 631-640.
Show et al., "Design of Bioreactors for Biohydrogen production", Journal of Scientific & Industrial Research, vol. 67 (2008), pp. 941-949.
Schimmel et al., "Determining the renewability of co-processed fuels; Final Report", ECOFYS, Apr. 2018, in 34 pages.
Serrano-Ruiz et al., "Catalytic Routes for the Conversion of Biomass into Liquid Hydrocarbon Transportation Fuels", Energy & Environmental Science, 2011, vol. 4, pp. 83-89.
Spath et al., "Life Cycle Assessment of Hydrogen Production via Natural Gas Steam Reforming", National Renewable Energy Laboratory, NREL/TP-570-27637, Feb. 2001, in 33 pages.
Stavrakas et al., "Striving Towards the Deployment of Bio-energy with Carbon Capture and Storage (BECCS): A review of Research Priorities and Assessment Needs", Sustainability Oct. 2018, 2206.
Streb et al., "Novel Adsorption Process for Co-Production of Hydrogen and CO2 from a Multicomponent Stream—Part 2: Application to Steam Methane Reforming and Autothermal Reforming Gases", Ind. Eng. Chem. Res. 59 (2020) 10093-10109.
Sun, et al., "Selection of Appropriate Biogas Upgrading Technology—a Review of Biogas Cleaning, Upgrading and Utilisation", Renewable and Sustainable Energy Reviews 51 (2015) 521-532.
Sun, et al., "Updates of Hydrogen Production from SMR Process in GREET". 2019.
Taylor, R., et al., "Options for a UK low carbon hydrogen standard: Final Report", Department for Business, Energy & Industrial Strategy, E4tech, May 2021 (this document uploaded in two parts).
U.S. Climate Change Technology Program—Technology Options for the Near and Long Term, Methane Emissions from Energy and Waste, "Conversion of Landfill Gas to Alternative Uses", section 4.1.2, Nov. 2003, pp. 153-155.
Union Calendar No. 94, 117th Congress 1st Session, H.R. 5376 (Report No. 117-130) (2021).
Van Der Drift, "SNG: A New Biomass-Based Energy Carrier," Energy Research Centre of the Netherlands, Apr. 23, 2006, pp. 1-21.
Van Der Meijden et al. "Production of bio-methane from woody biomass", Energy Research Centre of the Netherlands, ECN-M-09-086, Jun. 2009, pp. 1-8.
Wang, M. et al., "Greenhouse gases, Regulated Emissions, and Energy use in Technologies Model® (2022 .Net)", Computer Software. USDOE Office of Energy Efficiency and Renewable Energy

(56) References Cited

OTHER PUBLICATIONS (EERE), Oct. 10, 2022. URL: https://www.osti.gov/doecode/biblio/81029 (NPL document includes only the abstract).

Wang, "Low Carbon Steam Reforming-Based Hydrogen Production", Access date: Feb. 6, 2021, in 33 pages. URL: https://www.gasliquids.com/wp-content/uploads/2020_Hydrogen-Production-Using-Steam-Methane-Reforming.pdf.

Wang et al., "The Life-Cycle Analysis of Petroleum Fuels and Biofuels with GREET", Argonne National Laboratory, Dec. 2016 (Access date: Jun. 2, 2020), in 32 pages. URL: https://ww2.arb.ca.gov/sites/default/files/classic/fuels/lcfs/lcfs_meetings/12132016wang.pdf.

Wikipedia, "Greenhouse gas emissions", page last edited Nov. 21, 2021 (accessed Nov. 29, 2021), in 23 pages. URL: https://en.wikipedia.org/wiki/Greenhouse_gas_emissions.

Wismann, et al., "Electrified methane reforming: a compact approach to greener industrial hydrogen production", Science (2019), 364 (6442), 756-759.

Worley, et al., "Biomass Gasification Technology Assessment," National Renewable Energy Laboratory, Nov. 2012, pp. 1-358.

Yang et al., "Cost and Lifecycle Greenhouse Gas Implications of Integrating Biogas Upgrading and Carbon Capture Technologies in Cellulosic Biorefineries", Environ. Sci. Technol., 2020, 54, 12810-12819.

Zhou et al., "Life-cycle Greenhouse Gas Emissions of Biomethane and Hydrogen Pathways in the European Union", https://theicct.org/publication/life-cycle-greenhouse-gas-emissions-of-biomethane-and-hydrogen-pathways-in-the-european-union/ Access Date: Nov. 7, 2022.

International Search Report and Written Opinion issued in PCT Application No. PCT/CA2023/050486, dated Jun. 14, 2023.

International Search Report and Written Opinion issued in PCT Application No. PCT/CA2023/050484, dated Jun. 22, 2023.

Office Action for U.S. Appl. No. 18/162,950 dated Apr. 17, 2023.

Noussan, M. et al., "The Role of Green and Blue Hydrogen in the Energy Transition—A Technological and Geopolitical Perspective", Sustainability, 2020, vol. 13, in 26 pages.

Great Britain Office Action in GB Application No. 2404413.3 dated May 16, 2024.

International Search Report and Written Opinion issued in PCT Application No. PCT/CA2022/051769, dated Mar. 6, 2023.

International Search Report and Written Opinion issued in PCT Application No. PCT/CA2024/050365, dated Jun. 17, 2024.

International Search Report and Written Opinion issued in PCT Application No. PCT/CA2022/051768, dated Mar. 6, 2023.

\* cited by examiner

METHOD FOR MAKING LOW CARBON INTENSITY HYDROGEN

TECHNICAL FIELD

The disclosure relates to a process for producing hydrogen having a carbon intensity equal to or lower than a target carbon intensity.

BACKGROUND

Hydrogen is largely produced from the processing of fossil fuels. For example, hydrogen is often produced from the steam methane reforming (SMR) of natural gas or the gasification of coal. Unfortunately, the production of hydrogen from fossil fuels is associated with significant greenhouse gas (GHG) emissions and, in particular with significant carbon dioxide ($CO_2$) emissions. For example, hydrogen produced from the steam methane reforming of natural gas, which is often termed grey hydrogen, typically has a carbon intensity between 11.3 to 12.1 $kgCO_2e/kgH_2$.

One approach to reduce the GHG emissions associated with hydrogen production is to use carbon capture and sequestration (CCS), wherein $CO_2$ emissions from the hydrogen production are captured and sequestered (e.g., stored underground in suitable geological formations). In integrating CCS with hydrogen production from fossil fuels (e.g., natural gas or coal), the fossil-based $CO_2$ produced during the hydrogen production is captured and sequestered in order to prevent it from being released to the atmosphere, thereby reducing GHG emissions of the process. Such hydrogen is often referred to as blue hydrogen (regardless of whether it is derived from natural gas or coal).

While a large GHG emissions reduction can be achieved by including CCS of $CO_2$ from hydrogen production (e.g., a reduction of about 80-90% relative to without the CCS), such hydrogen can still be associated with significant GHG emissions. For example, the use of natural gas inevitably results in methane emissions from so-called fugitive leaks (e.g., methane emissions from the drilling, extraction, and/or transportation of the natural gas), such that blue hydrogen produced from natural gas often has a carbon intensity of 2.3 to 4.1 $kgCO_2e/kgH_2$. In order to compete with green hydrogen, which often has a carbon intensity of 0 to 0.6 $kgCO_2e/kgH_2$, and/or in order to qualify for incentives that require a relatively low carbon intensity (e.g., less than about 2.3 $kgCO_2e/kgH_2$, preferably less than about 1 $kgCO_2e/kgH_2$, and more preferably less than about 0.5 $kgCO_2e/kgH_2$, such as 0.45 $kgCO_2e/kgH_2$ or lower), it may be necessary to further reduce GHG emissions.

There is a need for blue hydrogen production facilities to satisfy ever-increasing clean hydrogen standards. The disclosure addresses this need and/or provides useful alternatives to known processes so as to produce hydrogen that meets a target carbon intensity.

SUMMARY

The present disclosure addresses one or more of the foregoing needs and/or problems in the art.

In particular, the present disclosure provides a process that allows a blue hydrogen production facility to meet or exceed a target carbon intensity (CI) associated with the hydrogen.

The target CI of the hydrogen is achieved by using renewable electricity to power at least part of the process (e.g., at least part of the hydrogen production). Such renewable electricity is produced from biomass, and at least some carbon derived from the biomass (e.g., $CO_2$ or char) is captured and sequestered as described herein. The use of such renewable electricity (e.g., in the blue hydrogen production facility) provides surprising reductions in the CI of the hydrogen produced therefrom. Advantageously, it has been found that in some processes of the disclosure, the use of such renewable electricity in a blue hydrogen production facility can decrease the CI of hydrogen produced to almost ten-fold relative to the more conventional solar or wind renewable electricity sources. Such surprising decreases in CI of the hydrogen can allow a blue hydrogen production facility to meet carbon emission reduction targets that otherwise could not be met using other renewable power sources.

Moreover, some of the processes herein may avoid or reduce any additional capital expenditure that may otherwise be needed to meet a target CI. Yet further, in some of the inventive processes herein, the low carbon intensity of the hydrogen can be achieved using only fossil fuel feedstock (e.g., natural gas or coal in a reforming process), and thus can exploit an abundant feedstock and mature industry.

Some of the processes herein may enable maximum benefits in the form of government incentives, such as fuel credits or other credits, to incentivize clean hydrogen production.

In accordance with one aspect of the instant invention there is provided a process of obtaining hydrogen from a blue hydrogen production facility that meets a target carbon intensity ($CI_T$), the process comprising: reforming non-renewable gaseous feedstock; capturing and sequestering fossil $CO_2$ derived from the non-renewable gaseous feedstock; and at least partially powering the process with carbon negative renewable electricity, the carbon negative renewable electricity being derived from biomass and generated from a production process where carbon derived from the biomass is captured and sequestered, wherein an amount of the carbon negative renewable electricity used in the process allows a carbon intensity of the hydrogen produced therefrom to be reduced sufficiently so that the target carbon intensity ($CI_T$) is achieved.

In accordance with one aspect of the instant invention there is provided a process for utilizing biomass to enable a blue hydrogen production facility to meet a target carbon intensity ($CI_T$) of hydrogen produced therefrom, the process comprising: producing carbon negative renewable electricity using the biomass, wherein carbon derived from the biomass is captured and sequestered; and providing the carbon negative renewable electricity to the blue hydrogen production facility to at least partially power the blue hydrogen production the blue hydrogen production comprising: reforming non-renewable gaseous feedstock; and capturing and sequestering fossil $CO_2$ derived from the non-renewable gaseous feedstock, wherein an amount of the carbon negative renewable electricity used in the blue hydrogen production allows a carbon intensity of the hydrogen produced therefrom to be reduced sufficiently so that the target carbon intensity ($CI_T$) is achieved.

In accordance with one aspect of the instant invention there is provided a method of making low carbon intensity hydrogen, the low carbon intensity hydrogen having a carbon intensity of 2.3 $kgCO_2e/kgH_2$ or lower, the method comprising: a) generating hydrogen from a process comprising: (i) converting non-renewable feedstock to a gas mixture comprising hydrogen and carbon dioxide; and (ii) capturing and sequestering at least some of the carbon dioxide; and b) at least partially powering the process with carbon negative renewable electricity, the carbon negative renewable electricity associated with a production process wherein renewable electricity is generated from biomass and wherein at least some carbon derived from the biomass is captured and sequestered, wherein a carbon intensity of the hydrogen generated is 2.3 kgCO$_2$e/kgH$_2$ or lower.

In accordance with one aspect of the instant invention there is provided, in a blue hydrogen production facility, using negative emission renewable electricity resulting from capturing and sequestering biogenic carbon produced during production of the renewable electricity from biomass, the use of the negative emission renewable electricity reducing emissions in the blue hydrogen facility associated with hydrogen produced therefrom to less than 2.3 kgCO$_2$e/kgH$_2$.

In accordance with one aspect of the instant invention there is provided a process comprising: generating renewable electricity from biomass, said renewable electricity associated with negative carbon emissions resulting, at least in part, from capturing and sequestering biogenic CO$_2$ derived from the biomass; and providing the renewable electricity for use in a fossil hydrogen production plant, thereby reducing emissions in the fossil hydrogen plant associated with hydrogen produced therefrom to less than 2.3 kgCO$_2$e/kgH$_2$.

In accordance with one aspect of the instant invention there is provided a process of obtaining hydrogen from a blue hydrogen production facility, the process comprising: producing hydrogen from non-renewable feedstock; capturing and sequestering fossil CO$_2$ derived from the non-renewable feedstock; and at least partially powering hydrogen production with carbon negative renewable electricity, the carbon negative renewable electricity produced using biomass in a production process comprising capturing and sequestering biogenic carbon derived from the biomass, wherein the amount of the renewable electricity used in the hydrogen production reduces a carbon intensity of the hydrogen produced therefrom to less than 2.3 kgCO$_2$e/kgH$_2$.

In accordance with one aspect of the instant invention there is provided a process for utilizing biomass to enable a blue hydrogen production facility to meet a target carbon intensity (CI$_T$) of hydrogen produced therefrom, the process comprising: producing carbon negative renewable electricity using biomass in a production process comprising capturing and sequestering biogenic carbon derived from the biomass; and providing the renewable electricity to the blue hydrogen production facility to at least partially power hydrogen production, the hydrogen production comprising: generating hydrogen from non-renewable feedstock; and capturing and sequestering fossil CO$_2$ derived from the non-renewable feedstock, wherein the amount of the carbon negative renewable electricity used in the blue hydrogen production facility reduces the carbon intensity of the hydrogen produced therefrom in an amount sufficient to achieve the target carbon intensity (CI$_T$).

According to any one of the foregoing aspects or embodiments, the hydrogen production facility produces the hydrogen by methane reforming comprising a water gas shift.

According to any one of the foregoing aspects or embodiments, the non-renewable gaseous feedstock comprises natural gas, refinery gas, liquid petroleum gas (LPG), light naphtha, heavy naphtha and/or straight-run naphtha.

According to any one of the foregoing aspects or embodiments, the non-renewable gaseous feedstock is natural gas.

DETAILED DESCRIPTION

Biomass

Figure 1:
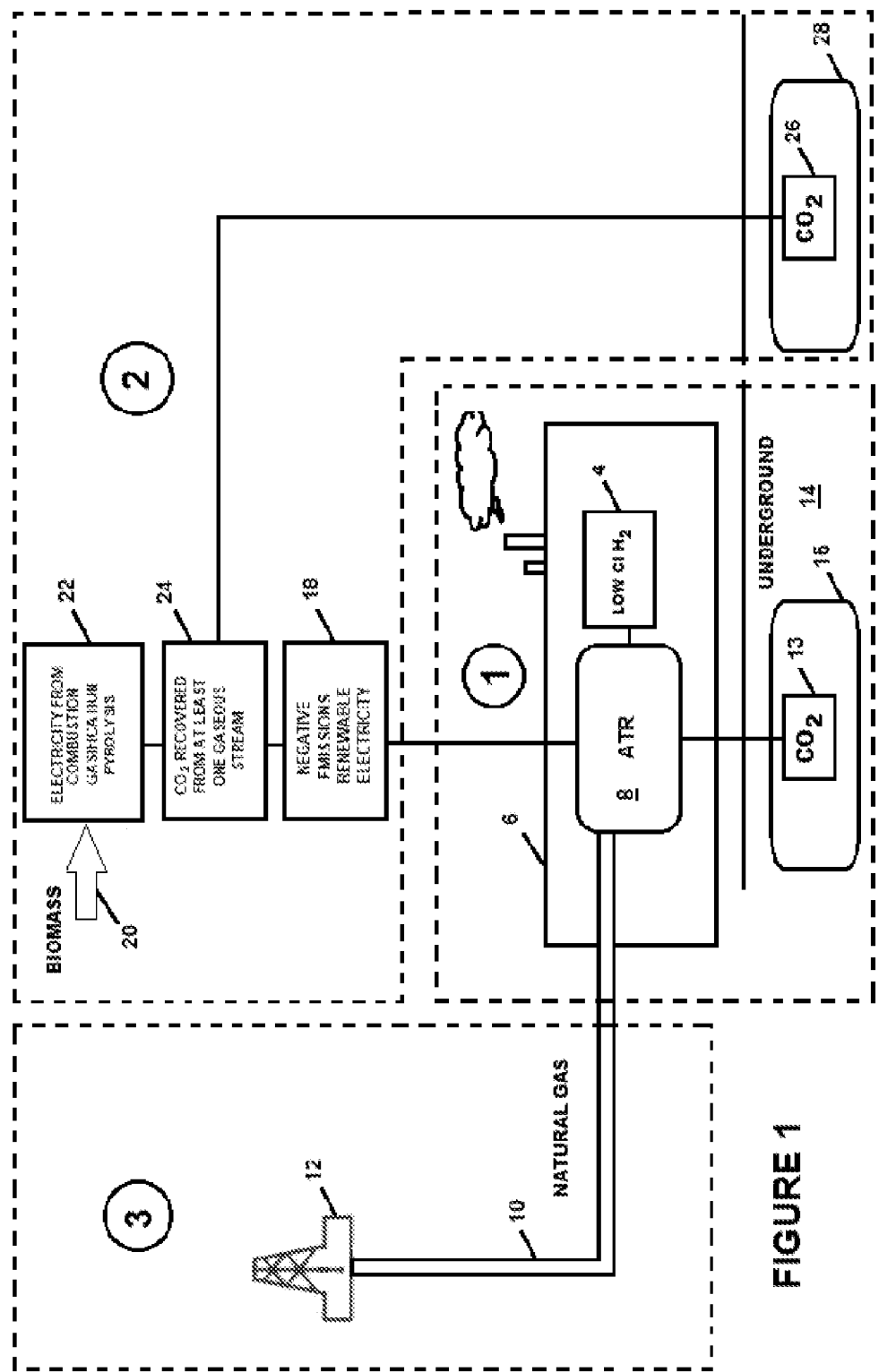
FIG. 1 describes an embodiment of a process for producing low carbon intensity (CI) hydrogen in a blue hydrogen production facility, the process comprising using renewable electricity. The renewable electricity is produced from biomass in which carbon dioxide derived therefrom is used for carbon capture and sequestration (CCS).

The process(es) and/or system(s) of the present disclosure use renewable electricity derived from biomass. Biomass refers to organic material originating from plants, animals, or micro-organisms (e.g., including plants, agricultural crops or residues, municipal wastes, animal wastes and algae). Biomass is a renewable resource, which can be naturally replenished on a human timescale, and which can be used to produce bioenergy and/or biofuels (e.g., biogas). Some examples of suitable biomass may include: (i) energy crops (e.g., switchgrass, sorghum, and the like); (ii) residues, byproducts, or waste from the processing of plant material in a facility, or feedstock derived therefrom (e.g., sugarcane bagasse, sugarcane tops/leaves, corn stover, etc.); (iii) agricultural residues (e.g., wheat straw, corn cobs, barley straw, corn stover, etc.); (iv) forestry material; (v) livestock manure, including swine and cow manure; (vi) food scraps, and/or (vii) municipal waste or components removed or derived from municipal waste. These examples of suitable biomass are advantageous in that they do not compete with food production. The use of forestry or agricultural feedstocks (e.g., energy crops, residues, by products, or waste from the processing of plant material in a facility, or feedstock derived therefrom, or agricultural residues) may be advantageous for reducing GHG emissions. The use of livestock manure, such as swine or cattle manure, is particularly advantageous in terms of reducing the lifecycle GHG emissions of the hydrogen, or fuel, fuel intermediate, or chemical production produced using the hydrogen. In certain embodiments, the biomass is fibrous biomass (e.g., straw).

The renewable electricity can be derived from any biomass (e.g., can be raw biomass or processed biomass, including biogas produced from anaerobic digestion) and can be produced using any suitable process (e.g., that produces heat and/or power) that also produces biogenic material (e.g., $CO_2$ or char) suitable for capture and sequestration (e.g., with or without additional processing). Advantageously, the capture and/or sequestration of carbon derived from the biomass (e.g., biogenic carbon or carbon that is treated as being biogenic by regulators) can reduce the carbon intensity of the renewable electricity. In some embodiments, the renewable electricity is produced by combustion, gasification, and/or pyrolysis.

In general, the renewable electricity can be generated from biomass using any suitable technology. In some embodiments, the renewable electricity is produced by the combustion of biomass (solid, liquid, and/or gaseous). Without being limiting, the biomass can be combusted to drive a turbine (e.g., gas or steam powered) or fuel an engine (e.g., reciprocating internal combustion engine) to generate electricity. For example, solid biomass (e.g., wood pellets) can be combusted (e.g., in a boiler) to generate steam used to drive a steam-powered turbine to generate electricity. Biogas (e.g., raw biogas, partially purified biogas, or fully upgraded biogas) can be combusted in a simple cycle gas-turbine, a combined cycle gas turbine (CCGT), or a reciprocating engine in order to generate the renewable electricity. In general, the renewable electricity can be produced from a facility that only produces electricity (i.e., does not produce heat that is used) or from a co-generation plant (e.g., a combined heat and power (CHP) plant that produces heat and electricity). It should be appreciated that the combustion may include co-firing of renewable and non-renewable feedstocks (e.g., in which solid biomass and a fossil feedstock, such as coal are combusted).

In another embodiment, the renewable electricity is produced by gasification. For example, the biomass may be exposed to high temperatures to produce syngas and/or biochar. The gasification may or may not be carried out with air or oxygen. In one non-limiting example, the biomass gasification is performed using air or oxygen to improve syngas quality for the combustion. In some embodiments, the syngas is combusted in a boiler to produce electricity. In other embodiments, the syngas is fed to a gas turbine to produce electricity (e.g., used in a combined-cycle gas turbine or an integrated gasification combined cycle (IGCC)). In other embodiments, the syngas is used in a fuel cell to generate electricity (e.g., after it is purified to produce a gas stream enriched in hydrogen). In some embodiments, the biogenic $CO_2$ for sequestration is captured from syngas itself or a gas mixture resulting from subjecting syngas to a water-gas shift reaction to produce $CO_2$ and hydrogen (e.g., is captured precombustion). In some embodiments, the biogenic $CO_2$ for sequestration is captured post-combustion (e.g., from syngas). Alternatively, or additionally, the biochar can be part of the carbon capture and sequestration.

In another embodiment, the renewable electricity is produced by pyrolysis. For example, solid biomass may be exposed to high temperatures (typically lower than gasification) with no or limited oxygen present to produce syngas, bio-oil, and/or biochar. The syngas can be used to generate the renewable electric power (e.g., using a boiler, gas turbine, or fuel cell). Alternatively, or additionally, the bio-oil can be used to generate the renewable electric power (e.g., burned in place of fuel oil or diesel in furnaces, turbines, and/or engines for electricity production). The $CO_2$ for carbon capture and sequestration can be captured pre-combustion of the syngas and/or bio-oil (e.g., from the syngas) or post combustion (e.g., from the flue gas), discussed further below. Alternatively, or additionally, the biochar and/or bio-oil can be part of the carbon capture and sequestration.

In another non-limiting example, the $CO_2$ for sequestration can be captured from biogas produced by anaerobic digestion.

Capturing and Sequestering Carbon Derived from Biomass (a) Capturing and Sequestering Carbon Dioxide Capturing and sequestering carbon dioxide derived from biomass that produces the renewable electricity comprises obtaining carbon dioxide from any suitable gaseous stream produced in connection with electricity production derived either directly or indirectly from biomass. The term "captured" is used herein in a non-limiting sense and includes any method, process and/or technique for obtaining carbon dioxide (e.g., from a mixture of other unwanted gases). For example, the $CO_2$ can be captured by one or more of a number of different technologies, including but not limited to adsorption, absorption, membranes, and cryogenic separations, optionally in combination with other physical and/or biological methods.

In those embodiments employing combustion of the biomass, the $CO_2$ is captured from any suitable gas generated from combustion of the biomass, including but not limited to a flue gas arising from the combustion or a gas derived therefrom. In some examples, the gas comprising the $CO_2$ for capture may be initially cooled (e.g., to about 30-60° C.) and introduced to an absorber that absorbs the $CO_2$ using a suitable solvent. The content of unwanted gases can be reduced to below a desired value. The solvent containing the $CO_2$ may be introduced to a stripper in which the solvent is regenerated. The bound $CO_2$ is desorbed by supplying heat and the $CO_2$ compressed and sequestered. It will be appreciated, however, that this method is merely exemplary and that other techniques can be utilized by those of skill in the art to capture the $CO_2$ for sequestration. As would be appreciated by those of skill in the art, other methods to remove the $CO_2$ from the flue gas 30 include adsorption, cryogenic techniques, or membrane separations, among others. In addition, the $CO_2$ capture is not limited to separating the $CO_2$ from flue gas. That is, $CO_2$ can be recovered from other suitable gaseous streams containing $CO_2$ derived from the combustion of the biomass.

In those embodiments employing combustion of biogas (e.g., raw biogas, partially purified biogas, or fully upgraded biogas), the $CO_2$ can be captured from any suitable gas generated from combustion of the biogas, including but not limited to a flue gas arising from the combustion or a gas derived therefrom. Alternatively, or additionally, in embodiments employing combustion of the partially purified biogas or fully upgraded biogas, at least some of the $CO_2$ can be captured during biogas upgrading or downstream of biogas upgrading (e.g., before combustion).

As noted above, the biogenic $CO_2$ may also be derived from the biomass via gasification. The gasification is carried out with or without air or oxygen and produces syngas, which comprises CO and hydrogen ($H_2$) as well as $CO_2$ (usually with other impurities). The $CO_2$ may be captured from a variety of gaseous mixtures arising from gasification. This includes capturing the $CO_2$ before or after combustion (e.g., of at least part of the syngas) to generate heat for the electricity production. In the pre-combustion capture, the $CO_2$ may be captured from syngas or a gas mixture derived therefrom, such as a mixture resulting from a water gas shift reaction of syngas that comprises $CO_2$ and $H_2$. Without being limiting, the $H_2$ remaining after $CO_2$ capture may be used to generate the renewable electricity (e.g., using internal combustion engines or hydrogen fuel cells). For example, the syngas can be subjected to a purification process to produce a stream enriched in $H_2$ used for generating electricity, and the $CO_2$ can be captured from the tail gas from the purification process (e.g., if the purification process is based on pressure swing adsorption (PSA), then the $CO_2$ can be captured from the purge gas). In the post-combustion capture, $CO_2$ is obtained from a gas mixture, such as a flue gas, arising from combustion of the syngas from the water gas shift reaction to produce the renewable electricity. The $CO_2$ from any one or a combination of a gas mixture comprising $CO_2$ can be separated by means of chemical or physical absorption. The $CO_2$ may be recovered using any suitable methodology, including but not limited to solvent adsorption as described above in connection with the combustion of biomass. (See for example, Dinca et al., 2018, 149:925-936, which is hereby incorporated by reference).

For pyrolysis, as noted, the $CO_2$ for carbon capture and sequestration can be captured pre- or post combustion. Depending on whether syngas is produced and/or its composition, the $CO_2$ can be captured from the syngas itself or a gaseous mixture resulting from a water-gas shift reaction or from a flue gas post-combustion. Alternatively, or additionally, syngas may be combusted to generate electricity and $CO_2$ is captured from a flue gas as described above in connection with gasification. Alternatively, or additionally, the biochar can be part of the carbon capture and sequestration. If pyrolysis oil is produced, the oil may be used as a heat source for combustion and the $CO_2$ is captured from a post-combustion gaseous mixture (often referred to as flue gas). In some embodiments, pyrolysis oil is converted to electrical power through co-combustion in conventional fossil fuels power plants, gas turbine combined cycle (GTCC) and diesel generators. Alternatively, or additionally, the pyrolysis oil can be part of the carbon capture and sequestration.

In some embodiments, the $CO_2$ capture may recover at least 50 wt %, more typically more than 70 wt % or more of the $CO_2$ from a given gaseous mixture.

The $CO_2$ thus captured is sequestered. This includes any methodology for sequestration of carbon dioxide, including any storage (e.g., underground), that is carried out so that most or all of the carbon dioxide is prevented from entering the atmosphere or in which entry to atmosphere thereof is delayed. The carbon dioxide may be introduced underground in a geological formation, such as an underground reservoir that sequesters the carbon dioxide. In some non-limiting embodiments, measures may be taken to reduce leakage of carbon dioxide from the geological formation. In another non-limiting example, the carbon dioxide is sequestered in concrete by its introduction to a concrete manufacturing process using known methods. In another non-limiting example, the carbon dioxide is sequestered as a result of its use in enhanced oil recovery (EOR) or for the production of one or more products (e.g., plastics). Sequestration of carbon dioxide often includes compressing the captured carbon dioxide (e.g., to produce liquid carbon dioxide or for injection into a carbon dioxide distribution system) and transporting the captured carbon dioxide for sequestration (e.g., by vehicle and/or a carbon dioxide distribution system). As will be understood by those skilled in the art, it can be advantageous to sequester the captured carbon dioxide using a method recognized by the applicable regulatory authority for reducing GHG emissions and/or mitigating climate change. In certain embodiments, the carbon dioxide is provided for sequestration by transporting it (e.g., by pipeline or vehicle) to a carbon capture and sequestration hub or site (e.g., an injection site). The terms "sequester," "sequestering," or "sequestration," as used herein with reference to captured carbon (e.g., biogenic carbon dioxide), refer to one or more processes wherein the captured carbon, or an equal quantity of carbon displaced by the captured carbon (e.g., biogenic carbon dioxide), is stored and/or used in a way that reduces the level of carbon dioxide in the atmosphere.

(b) Capturing and Sequestering Carbon from Carbon-Containing Material

In addition, or as an alternative to carbon dioxide capture and sequestration, the renewable electricity from biomass with CCS may be produced by sequestering carbon-containing material derived from the biomass that is not used to generate electricity. For example, in some embodiments, residue from the biogas production process, or residue from the electricity production, or material derived from such residue, is sequestered. Such residue comprises carbon and thus providing it, and/or material derived therefrom, for use in carbon capture and sequestration may also reduce the CI of the renewable electricity so that it is negative.

In some embodiments, the residue is a digestate from anaerobic digestion, in which biogas produced therefrom is used to produce the renewable electricity. Digestate refers to the material remaining after one or more stages of the anaerobic digestion (e.g., the term may refer to acidogenic digestate, methanogenic digestate, or a combination thereof). The digestate can include any organic material not digested by the anaerobic microorganisms, byproducts of the anaerobic digestion released by the microorganisms, and/or the microorganisms themselves. For example, the digestate can include carbohydrates, nutrients (such as nitrogen compounds and phosphates), other organics, and/or wild yeasts. The composition of digestate can vary depending on the biomass from which it is derived. Digestate in some embodiments has both a solid and liquid component. Thus, the residue can be in the form of solid, liquid or semi-solid material. A common use of digestate is as a soil conditioner, where it can provide nutrients for plant growth and/or displace the use of fossil-based fertilizers. In certain embodiments of the disclosure, the digestate is processed to provide carbon-containing material that that can be sequestered as part of the carbon capture and sequestration. In general, one or more types of carbon-containing material containing and/or derived from at least part of the residue may be sequestered.

In certain embodiments of the disclosure, the residue is a carbon-containing material such as bio-oil (e.g., produced from fast pyrolysis). In certain embodiments of the disclosure, the residue is a carbon-containing material such as bio-oil, and the sequestration includes injecting the bio-oil into deep geological formations for substantially permanent storage.

In certain embodiments of the disclosure, the residue is a carbon-containing material, such as biochar. In one embodiment, the biochar, which can be produced from gasification and/or pyrolysis of the biomass, can be recycled within the gasification and/or pyrolysis processes (e.g., to provide additional fuel for the process). Alternatively, biochar, which is biologically unavailable, can be provided as a soil amendment where it can sequester the carbon in the soil for prolonged periods of time, such as for centuries. In certain embodiments of the disclosure, the carbon sequestration includes providing biochar as a soil amendment (e.g., instead of recycling it within the process), or includes subjecting a carbon-containing material derived from the biomass and not converted to bioenergy (e.g., a portion of the digestate) to gasification and/or pyrolysis, and providing the biochar produced therefrom for soil amendment, for carbon capture and sequestration, and/or some other external use.

In certain embodiments of the disclosure, the carbon sequestration includes storing carbon in a product. In this case, a carbon-containing material derived from the biomass and not converted to renewable electricity is used to produce a product that makes the carbon unavailable for biodegradation (e.g., can be provided in products that provide continued sequestration benefits, such as building materials).

In certain embodiments of the disclosure, the carbon-containing material is sequestered as a liquid, semi-solid and/or solid material derived from (e.g., obtained from or produced from) a part of the biomass not converted to bioenergy. In certain embodiments of the disclosure, the sequestration includes sequestering liquid, semi-solid and/or solid carbon-containing material derived from the residue. In some embodiments, the material is sequestered indefinitely in a subsurface formation. For example, the digestate can be subjected to a hydrothermal liquefaction to provide a bio-oil that can be sequestered.

Renewable Electricity Having Low Carbon Intensity (CI)

The renewable electricity that is used to at least partially power the process (e.g., hydrogen production process) in some embodiments has a carbon intensity (CI) value that is negative. For example, the CI of the electricity may be negative, such as −100 $gCO_2e/kWh$ or lower, for example, lower than −125 $gCO_2e/kWh$, −150 $gCO_2e/kWh$, −175 $gCO_2e/kWh$, −200 $gCO_2e/kWh$ or −225 $gCO_2e/kWh$.

The term "carbon intensity" or "CI" refers to the quantity of lifecycle GHG emissions associated with a product for a given production process, and is often expressed as grams of $CO_2$ equivalent emissions per unit of product produced (e.g., $gCO_2e/MJ$ of fuel, $gCO_2e/MMBTU$ of fuel, $gCO_2e/kWh$ of electricity, or $kgCO_2e/kg$ of fuel/product). As will be understood by those skilled in the art, lifecycle GHG emissions and/or carbon intensity are often determined using Lifecycle Analysis (LCA), which identifies and estimates all GHG emissions in producing a fuel or product, from the growing or extraction of raw materials, to the production of the fuel or product, through to the end use (e.g., well-to-wheel). Those skilled in the art will understand that lifecycle GHG emissions and/or carbon intensity values for a given fuel or product can be dependent upon the methodology used (e.g., as required by the applicable regulatory authority).

The term "carbon negative renewable electricity" or "carbon negative electricity" or "negative emissions renewable electricity", refers to electricity having a CI value below 0 as determined by the GREET 2022 model. This includes electricity from a fungible grid that is treated as carbon-negative electricity by regulators. In general, the carbon negative renewable electricity is derived from biomass (e.g., is at least treated as being produced using biomass by regulators).

In general, any methodology can be used to determine carbon intensity and/or lifecycle GHG emissions. However, when the hydrogen and/or fuel/product produced using the hydrogen is specially treated for meeting a certain lifecycle GHG reduction threshold under certain regulations (e.g., is treated as clean or low carbon intensity hydrogen) and/or when the method includes obtaining one or more credits for the hydrogen and/or its production, and/or for fuel, fuel intermediate, or product produced from the hydrogen, or its production, the methodology will be selected to comply with the prevailing rules and regulations in the applicable jurisdiction (e.g., relevant to desired credits).

Methodologies for calculating carbon intensities and/or lifecycle GHG emissions according to various regulatory bodies are well known in the art and can be readily calculated by those of ordinary skill in the art. For example, in certain embodiments, the carbon intensities and/or lifecycle GHG emissions are determined using a LCA model, such as the GREET model. The GREET model, which is well-known by those skilled in the art, refers to "The Greenhouse gases, Regulated Emissions, and Energy use in Technologies Model" developed at Argonne National Laboratory (ANL) (see e.g., greet.es.anl.gov). In certain embodiments, the carbon intensities and/or lifecycle GHG emissions are determined based on the fuel/product being produced according to a certain pathway (e.g., a fuel pathway). For example, in certain embodiments, the carbon intensities are pathway certified carbon intensities or are regulatory default value carbon intensities. In general, the term "fuel pathway" refers to a collective set of processes, operations, parameters, conditions, locations, and technologies throughout all stages that the applicable agency considers appropriate to account for in the system boundary of a complete analysis of that fuel's lifecycle greenhouse gas emissions. In some cases, a fuel pathway can be a specific combination of three components, namely: (1) feedstock, (2) production process, and (3) product or fuel type. In certain embodiments, the carbon intensities are regulatory default value carbon intensities. The CI values herein are determined using GREET 2022, unless otherwise specified.

According to one embodiment, the renewable electricity from biomass with CCS is introduced to a fungible utility grid by a party that produces the renewable electricity or an intermediary thereof and wherein electricity is sourced from the grid by the blue hydrogen production facility, the electricity having a carbon intensity corresponding to the renewable electricity introduced to the grid. Typically, in such embodiment, the renewable electricity producer or an intermediary thereof will arrange for the hydrogen producer to withdraw a corresponding amount of electricity from the grid for use at the blue hydrogen production facility. The electricity used at the hydrogen production facility will have a carbon intensity corresponding to that of the renewable electricity introduced to the grid. In another embodiment, the renewable electricity is produced on-site at the blue hydrogen production facility or within a 100 km radius of the facility. In such embodiment, a dedicated power system may be used to provide the renewable electricity to the plant or the electricity may be introduced to a power grid.

Hydrogen Production

The renewable electricity is provided at a hydrogen production facility and is used to at least partially power the process (e.g., hydrogen production). The term "hydrogen production facility" as used herein includes any unit operation(s) that makes hydrogen regardless of its location or proximity to another facility or unit operation(s) that uses such hydrogen produced in such facility. The hydrogen produced in such facility can be purified therein or sent to another unit operation(s) or process that removes unwanted components therefrom. Without limitation, the hydrogen production facility can include any unit operation or operations within or in proximity to another facility or plant, such as an oil refinery or an ammonia or fertilizer production plant, or the like, or a stand-alone facility that produces hydrogen as a product or as an intermediate to make another product, including a fuel. Additional examples are readily conceivable by those of skill in the art and accordingly the term is not to be construed as limited to the examples described herein or any particular type of hydrogen production facility.

The hydrogen production facility uses non-renewable feedstock (e.g., fossil feedstock), which in some embodiments is a gaseous feedstock. Typically, the non-renewable gaseous feedstock includes natural gas and/or refinery gas. The natural gas and/or refinery gas can arise from a variety of sources. In another embodiment, the hydrogen is produced from coal gasification. The invention is not limited by the type of non-renewable feedstock, whether present in gaseous, liquid or solid form, although in some embodiments natural gas is the most advantageous non-renewable feedstock as it is abundant and readily available from gas pipelines. In some embodiments, the hydrogen production facility also uses renewable feedstock. In addition, since some technologies for reforming gaseous feedstock (e.g., ATR) can require more electricity (e.g., per amount of feedstock provided), there can be greater advantages to using carbon negative renewable electricity for the hydrogen production.

In general, the hydrogen production in the hydrogen production facility can use any suitable technology known in the art that can convert at least some of the non-renewable feedstock (e.g., gaseous feedstock such as natural gas) to hydrogen. Examples of technologies that may be suitable include, but are not limited to, steam methane reforming (SMR), autothermal reforming (ATR), partial oxidation (POX), and dry methane reforming (DMR). SMR, ATR, and DMR, which are types of catalytic reforming, may operate by exposing natural gas to a catalyst at high temperature and pressure to produce syngas. POX reactions, which include thermal partial oxidation reactions (TPOX) and catalytic partial oxidation reactions (CPOX), may occur when a sub-stoichiometric fuel-oxygen mixture is partially combusted in a reformer. POX also may be referred to as oxidative reforming. For purposes herein, the term "methane reforming" may refer to SMR, ATR, DMR, and/or POX. In one embodiment, the hydrogen is produced from steam reforming. In one embodiment, the hydrogen is produced most advantageously by methane reforming that is ATR.

The syngas produced from methane reforming may be further reacted in a water gas shift (WGS) reaction, wherein carbon monoxide is converted to carbon dioxide and hydrogen:

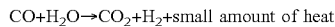

$$CO + H_2O \rightarrow CO_2 + H_2 + \text{small amount of heat}$$

Although optional, providing a WGS downstream of methane reforming increases the yield of $H_2$, and thus is commonly included in hydrogen production. When included, the WGS is considered to be part of the methane reforming herein. The syngas produced from methane reforming often includes hydrogen, methane, carbon monoxide, carbon dioxide and water vapour. As will be understood by those skilled in the art, methane reforming can be conducted using one or more reactors. For example, the WGS can be conducted using a high temperature WGS reactor followed by a low temperature WGS reactor.

The carbon dioxide produced from the hydrogen production is sequestered as part of CCS. For SMR, the carbon dioxide can be captured from the syngas (e.g., using vacuum pressure swing adsorption (VPSA) or an absorption amine unit), off-gas from hydrogen purification, and/or from a flue gas (e.g., using an activated amine process). Without being limiting in any way, in some embodiments, it may be more technically and/or economically more feasible to capture the carbon dioxide from the syngas, or a stream derived therefrom (e.g., off gas from hydrogen purification), as the flue gas may have a relatively low carbon dioxide concentration (e.g., relatively low partial pressure), may be at a lower pressure (e.g., atmospheric), and/or may be contaminated with nitrogen. For ATR, the carbon dioxide can be captured from the syngas or from an off-gas from hydrogen purification.

The terms "blue hydrogen production facility" or "blue hydrogen production", as used herein, refers to one or more facilities or processes, respectively, for making the low carbon intensity hydrogen wherein the feedstock for making the low carbon intensity hydrogen is predominantly fossil-based (i.e., at least 80% on an energy basis), where at least some carbon dioxide produced from the hydrogen production is captured and sequestered. In certain embodiments, about 100% of the feedstock for the hydrogen production is non-renewable (e.g., is natural gas and/or refinery gas).

Using Renewable Electricity for Hydrogen Production

The carbon negative renewable electricity is used to at least partially power the process. For example, the renewable power can be used to provide at least some, or in certain examples all, of the energy for methane reforming, for producing steam, for hydrogen purification, for producing oxygen (e.g., for gasification or ATR), for compression (e.g., of the hydrogen product and/or the fossil carbon dioxide), liquefaction (e.g., of the fossil carbon dioxide), and/or plant operations. It should be understood that the use of the carbon negative renewable electricity can be used in any unit operation or combination of operations within a blue hydrogen production facility. That is, the invention is not limited by where the electricity is used or integrated within the facility and thus can be used for steam methane reforming or any upstream or downstream processes and/or unit operations that draw power in the facility in the form of electricity.

The carbon negative renewable electricity in one example is used for plant operations in the hydrogen production facility, such as for lighting and/or for the generation of heat for any process(es) or unit operations(s). Without being limiting, the electricity driven heat sources could be in the form of a resistive heater, a plasma or an induction heater.

In one embodiment, the reforming is electrically heated with the carbon negative renewable electricity. For example, heat for carrying out reforming may be provided by resistance heating using the carbon negative renewable electricity. An example of a reformer that is powered by electricity is described in WO2019/229798 and Wismann et al., 2019, Science, 364(6442):756-759, each of which are incorporated herein by reference. In such non-limiting example, a catalyst used in reforming has electrically conductive material and the carbon negative renewable electricity is used to heat the catalyst to an elevated temperature by passing the electric current through the electrically conductive material. In one embodiment, electrification of reforming using the carbon negative renewable electricity replaces at least a portion of the combustion of fossil fuel as a heat source.

In another example, at least some of the carbon negative renewable electricity may be used to power an air separation unit (ASU) that provides oxygen for autothermal reforming (ATR) that produces the hydrogen. The high electricity usage in ATR is at least partly due to the ASU. For example, ASUs typically use cryogenic air separation technology to separate air into its primary components, typically nitrogen and oxygen, and often argon. More specifically, ASUs often cool air until it liquefies, followed by a fractional distillation, thereby providing relatively pure oxygen and nitrogen. A lot of the electricity usage is associated with the cooling and/or compression. For example, an air compressor is typically provided to compress air near the inlet of the unit. This compression, which is energy intensive, can be used for cooling (e.g., with an expansion turbine).

In a further example, at least some of the carbon negative renewable electricity is used to provide power for compression of $CO_2$ prior to sequestration using techniques known to those of skill in the art (e.g., for transport via a $CO_2$ pipeline and/or for liquefaction of the $CO_2$).

The above examples are merely exemplary and, as would be appreciated by those of skill in the art, other unit operations at any location within the facility could use the carbon negative renewable electricity for power.

In one embodiment, at least a portion of the electricity at the hydrogen production facility is replaced with the carbon negative renewable electricity. For example, in various embodiments at least 70%, at least 75%, at least 80%, at least 85%, at least 90% or at least 95% of the electricity at the hydrogen production facility is replaced with the carbon negative renewable electricity. In certain embodiments, about 100% of the electricity used at the hydrogen production facility is carbon negative renewable electricity.

In certain embodiments, the CI of the carbon negative renewable electricity is −100 $gCO_2e/kWh$ or lower, −120 $gCO_2e/kWh$ or lower, −140 $gCO_2e/kWh$ or lower, −160 $gCO_2e/kWh$ or lower, −180 $gCO_2e/kWh$ or lower, −200 $gCO_2e/kWh$ or lower.

In certain embodiments, due to the use of the carbon negative renewable electricity, the target carbon intensity $CI_T$ of the hydrogen meets (i.e., is equal to or lower than) a predetermined carbon intensity threshold (e.g., set by a regulatory agency). For example, in some embodiments, the target carbon intensity is a carbon intensity determined using GREET 2022 that is less than or equal to about 2.3 $kgCO_2e/kgH_2$, 1 $kgCO_2e/kgH_2$, 0.5 $kgCO_2e/kgH_2$ or less than 0 $kgCO_2e/kgH_2$. In some embodiments, it may be advantageous to meet a target carbon intensity of 0 (i.e., a carbon intensity that is equal to or less than zero) as it can produce zero-emission hydrogen or hydrogen having a negative carbon intensity. In some embodiments, the target carbon intensity is a carbon intensity determined using GREET 2022 that is less than or equal to about −10 $gCO_2e/MJ$, less than or equal to about −0.5 $kgCO_2e/kgH_2$, or less than or equal to about −1 $kgCO_2e/kgH_2$.

In certain embodiments, an amount of the carbon negative renewable electricity used in the process is selected to reduce a carbon intensity of the hydrogen to meet a $CI_T$ of 0.5 $kgCO_2e/kgH_2$, 1.0 $kgCO_2e/kgH_2$, or 2.3 $kgCO_2e/kgH_2$, as determined using GREET 2022 (i.e., reduced relative to not using the carbon negative renewable electricity). In certain embodiments, the hydrogen produced from the process would have a carbon intensity determined using GREET 2022 that is greater than a target carbon intensity of 0.5 $kgCO_2e/kg\ H_2$, 1.0 $kgCO_2e/kgH_2$, or 2.3 $kgCO_2e/kgH_2$ if all of the electricity used at the blue hydrogen production facility was derived from fossil fuels, and an amount of the carbon negative renewable electricity that is used in the process is sufficient to reduce the carbon intensity of the hydrogen to meet the target intensity (e.g., to less than about 0.5 $kgCO_2e/kgH_2$, about 1.0 $kgCO_2e/kgH_2$, or about 2.3 $kgCO_2e/kgH_2$, respectively). In certain embodiments, the hydrogen produced from the process would have a carbon intensity determined using GREET 2022 that is greater than a target carbon intensity of 0.5 $kgCO_2e/kg\ H_2$, 1.0 $kgCO_2e/kgH_2$, or 2.3 $kgCO_2e/kgH_2$ if all of the electricity used at the blue hydrogen production facility was renewable electricity having a positive carbon intensity or a carbon intensity of zero, and an amount of the carbon negative renewable electricity that is used in the process is sufficient to reduce the carbon intensity of the hydrogen to meet the target intensity (e.g., to less than about 0.5 $kgCO_2e/kgH_2$, about 1.0 $kgCO_2e/kgH_2$, or about 2.3 $kgCO_2e/kgH_2$, respectively).

In some embodiments, the CI reduction of hydrogen from use of electricity is at least 1.0 kg of $CO_2e/kg\ H_2$, 1.2 kg of $CO_2e/kg\ H_2$, 1.4 kg of $CO_2e/kg\ H_2$, 1.6 kg of $CO_2e/kg\ H_2$ or 1.8 kg of $CO_2e/kg\ H_2$.

Use of Hydrogen Produced in the Hydrogen Production Facility

In certain embodiments of the disclosure, the hydrogen is used in the hydroprocessing (e.g., hydrocracking and/or hydrotreating) of crude-oil derived liquid hydrocarbon (e.g., used in an oil refinery).

In certain embodiments, the hydrogen is used to produce ammonia in a Haber-Bosch process. In the Haber-Bosch process, which is well-known to those skilled in the art, nitrogen is converted to ammonia according to the following reaction:

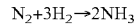

$$N_2 + 3H_2 \rightarrow 2NH_3$$

The reaction is conducted under high temperatures and pressures with a metal catalyst. Ammonia has an important role in the agricultural industry for production of fertilizers. Ammonia may also be used as an energy carrier for energy storage and transportation.

In certain embodiments of the disclosure, the hydrogen is provided as a product (e.g., for use in a fuel cell or a fuel). For example, the hydrogen can be used for transportation purposes, for generating electricity, and/or for use in district heating.

In certain embodiments of the disclosure, the hydrogen is provided as feedstock in a production process that produces a fuel, fuel intermediate, chemical product, or any combination thereof. A fuel refers to a material (e.g., solid, liquid, or gaseous), which may contain carbon, that can be combusted to produce power or heat (e.g., may be a transportation or heating fuel). A fuel intermediate is a precursor used to produce a fuel by a further conversion process, such as by a biologic conversion, a chemical conversion, or a combination thereof. A chemical product refers to a chemical compound used in a production process or a product such as a commodity. An example of a chemical product produced from hydrogen is fertilizer.

In certain embodiments of the disclosure, the hydrogen is provided as feedstock to produce a fuel selected from long-haul trucking fuel (e.g., diesel), shipping fuel (e.g., heavy fuel oil), aviation fuel (e.g., kerosene, jet fuel) or district heating fuel. In certain embodiments of the disclosure, the hydrogen is provided as feedstock to produce fuels or chemical products such as ammonia or fertilizer.

In certain embodiments of the disclosure, the hydrogen is used to produce one or more alcohols via gas fermentation using known processes. In gas fermentation, which is well-known to those skilled in the art, a gas mixture typically containing hydrogen with carbon dioxide and/or carbon monoxide is fed into a fermentation tank. In this embodiment, the carbon monoxide in the syngas functions as a substrate for the biologic conversion, which utilizes microorganisms or other biocatalysts. For example, acetogenic microorganisms can be used to produce a fermentation product from carbon monoxide. The production of ethanol by the acetogenic microorganisms proceeds through a series of biochemical reactions.

In certain embodiments of the disclosure, the hydrogen is used to produce methanol. For example, methanol can be produced by directly hydrogenating pure carbon dioxide with hydrogen with Cu/ZnO-based catalysts. Alternatively, hydrogen can be used to produce methanol according to the following reactions:

$$CO_2+H_2 \rightarrow CO+H_2O \text{(reverse water gas shift)}$$

$$CO+2H_2 \rightarrow CH_3OH$$

The methanol can be used as a fuel (e.g., mixed with gasoline) or can be used to produce a fuel (e.g., biodiesel).

In certain embodiments of the disclosure, the hydrogen is used to produce gasoline, diesel, or waxes using the Fischer-Tropsch process. The Fischer-Tropsch process refers to a collection of chemical reactions that converts syngas into liquid hydrocarbons, typically in the presence of metal catalysts under elevated pressures and temperatures. The Fischer-Tropsch process is well known. In the embodiments including a Fischer-Tropsch process, the hydrogen may be used to supplement another gas feed containing carbon monoxide and/or carbon dioxide in order to provide the required $H_2:CO$ (e.g., about 2).

Obtaining Credits

In certain embodiments of the disclosure, the process includes generating, obtaining, or providing credits. Credits are used to incentivize renewable fuels, often in the transportation sector. For example, credits, such as fuel credits, can be used to demonstrate compliance with some government initiative, standard, and/or program, where the goal is to reduce GHG emissions (e.g., reduce carbon intensity in transportation fuels as compared to some baseline level related to conventional petroleum fuels) and/or produce a certain amount of biofuel (e.g., produce a mandated volume or a certain percentage of biofuels). The target GHG reductions and/or target biofuel amounts may be set per year or for a given target date. Some non-limiting examples of such initiatives, standards, and/or programs include the Renewable Fuel Standard Program (RFS2) in the United States, the Renewable Energy Directive (RED II) in Europe, the Fuel Quality Directive in Europe, the Renewable Transport Fuel Obligation (RTFO) in the United Kingdom, and/or the Low Carbon Fuel Standards (LCFS) in California, Oregon, or British Columbia). Credits can also be used to incentivize other products associated with reduced carbon or greenhouse gas emissions, such as for example, producer or production credits for clean hydrogen or credits for products made using clean hydrogen.

The term "credit", as used herein, refers to any rights or benefits relating to GHG or carbon reduction including but not limited to rights to credits, revenues, offsets, GHG gas rights, tax benefits, government payments or similar rights related or arising from emission reduction, trading, or any quantifiable benefits (including recognition, award or allocation of credits, allowances, permits or other tangible rights), whether created from or through a governmental authority, a private contract, or otherwise. A credit can be a certificate, record, serial number or guarantee, in any form, including electronic, which evidences production of a quantity of hydrogen or fuel meeting certain life cycle GHG emission reductions relative to a baseline (e.g., a fossil baseline) set by a government authority. Credits for low CI hydrogen may be set by regulatory authority and provided in many forms, e.g., producer credits and the like. Non-limiting examples of fuel credits include RINs and LCFS credits. A Renewable Identification Number (or RIN), which is a certificate that acts as a tradable currency for managing compliance under the RFS2, may be generated for each gallon of biofuel (e.g., ethanol, biodiesel, etc.) produced. A Low Carbon Fuel Standard (LCFS) credit, which is a certificate which acts as a tradable currency for managing compliance under California's LCFS, may be generated for each metric ton (MT) of $CO_2$ reduced.

In general, the requirements for generating or causing the generation of credits can vary by country, the agency, and or the prevailing regulations in/under which the credit is generated. In many cases, credit generation may be dependent upon a compliance pathway (e.g., predetermined or applied for) and/or the biofuel meeting a predetermined GHG emission threshold. For example, with regard to the former, the RFS2 categorizes biofuel as cellulosic biofuel, advanced biofuel, renewable biofuel, and biomass-based diesel. With regard to the latter, to be a renewable biofuel under the RFS2, corn ethanol should have lifecycle GHG emissions at least 20% lower than an energy-equivalent quantity of gasoline (e.g., 20% lower than the 2005 EPA average gasoline baseline of 93.08 $gCO_2e/MJ$). In low carbon-related fuel standards, biofuels may be credited according to the carbon reductions of their pathway. For example, under California's LCFS, each biofuel is given a carbon intensity score indicating their GHG emissions as grams of $CO_2$ equivalent per megajoule (MJ) of fuel, and credits are generated based on a comparison of their emissions reductions to a target or standard that may decrease each year (e.g., in 2019, ethanol was compared to the gasoline average carbon intensity of 93.23 $gCO_2e/MJ$), where lower carbon intensities generate proportionally more credits.

In certain embodiments of the disclosure, the process includes monitoring inputs and/or outputs from each of the biogas production, hydrogen production, and/or CCS. In this case, each of the inputs is a material input or energy input and each of the outputs is a material output or an energy output. Monitoring inputs and/or outputs of these process may facilitate calculating and/or verifying GHG emissions of the process, calculating and/or verifying carbon intensity of the fuel, fuel intermediate, or chemical product, may facilitate credit generation (e.g., based on volumes of fuel produced), and/or may facilitate determining renewable content (e.g., when co-processing renewable and non-renewable fuels). Monitoring can be conducted over any time period (e.g., monthly statements, etc.). Monitoring can be conducted in conjunction with and/or using any suitable technology or combination of technologies that enables measurement of material and/or energy flows.

Meeting a Target CI and/or Clean Hydrogen Standards

In certain embodiments of the disclosure, the process includes producing hydrogen that is treated as clean hydrogen under applicable regulations (e.g., produced in compliance with a greenhouse gas emissions standard established by government). Whether such hydrogen and/or its production qualifies as clean hydrogen under applicable regulations and/or qualifies for one or more credits can depend on the applicable regulations (e.g., on the clean hydrogen standards). In one approach to determining whether hydrogen qualifies as clean hydrogen, the GHG emissions of hydrogen production are compared to some lifecycle GHG emission threshold as a percent savings relative to a fossil comparator. For example, in one approach clean hydrogen could require an at least 60% GHG savings versus a natural gas SMR benchmark of 91 $gCO_2e/MJ(LHV)$. In general, the CI of such fossil comparators can depend on the applicable regulations. For purposes herein, a "fossil comparator" for hydrogen production has a CI of about 102 gCO$_2$e/MJ H$_2$ (LHV), unless stated otherwise.

In certain embodiments of the disclosure, the process includes producing hydrogen wherein a target carbon intensity (CI$_T$) is achieved (i.e., the carbon intensity of the hydrogen is equal to or lower than CI$_T$).

Description of Exemplary Flow Diagrams

FIG. 1 depicts a flow diagram for obtaining low CI hydrogen 4 from a blue hydrogen production facility 6 that meets a target carbon intensity (CI$_T$). The process in this exemplary flow diagram comprises reforming non-renewable gaseous feedstock 8. In this embodiment, the non-renewable gaseous feedstock is subjected to autothermal reforming (ATR), however, in other embodiments, another reforming technology is used. In this example natural gas 10 is the non-renewable gaseous feedstock. The natural gas 10 may be derived from a fossil source, such as an oil well 12. The blue hydrogen production facility 6 captures and sequesters fossil CO$_2$ 13 derived from the non-renewable gaseous feedstock underground 14 in a geological formation 16.

The flowsheet further depicts at least partially powering hydrogen production in the hydrogen production facility 6 with carbon negative renewable electricity 18. The carbon negative renewable electricity 18 is derived from biomass 20. The biomass 20 can be used to generate electricity 22 by one or more processes, including combustion, gasification, or pyrolysis, among others. The CO$_2$ 26 is recovered from at least one gaseous stream 24 produced as a byproduct of electricity generation (e.g., pre- or post-combustion). The CO$_2$ 26 so recovered is placed underground in a geological formation 28.

The use of the renewable electricity in the hydrogen production allows the carbon intensity of the hydrogen produced therefrom to be reduced sufficiently so that the target carbon intensity (CI$_T$) is achieved. Example 1 below provides calculations of the CI associated with the low CI H$_2$ produced by the hydrogen production facility and demonstrates surprising reductions in the CI of the hydrogen relative to the use of other more conventional green electricity sources such as solar and wind energy.

The blocks 1, 2 and 3 depicted in stippled lines in FIG. 1 are used to calculate the CI intensity and described in more detail below with reference to Example 1. Block 1 refers to CI intensity associated with blue hydrogen production, block 2 is carbon intensity due to the carbon negative renewable electricity 18 and block 3 to natural gas production and transportation.

FIGS. 2, 3 and 4A-C describe combustion, gasification and pyrolysis respectively of biomass with carbon capture and sequestration of carbon dioxide to produce the carbon negative renewable electricity 18. Like reference numbers among FIGS. 1-4 refer to the same or similar elements.

Figure 2:
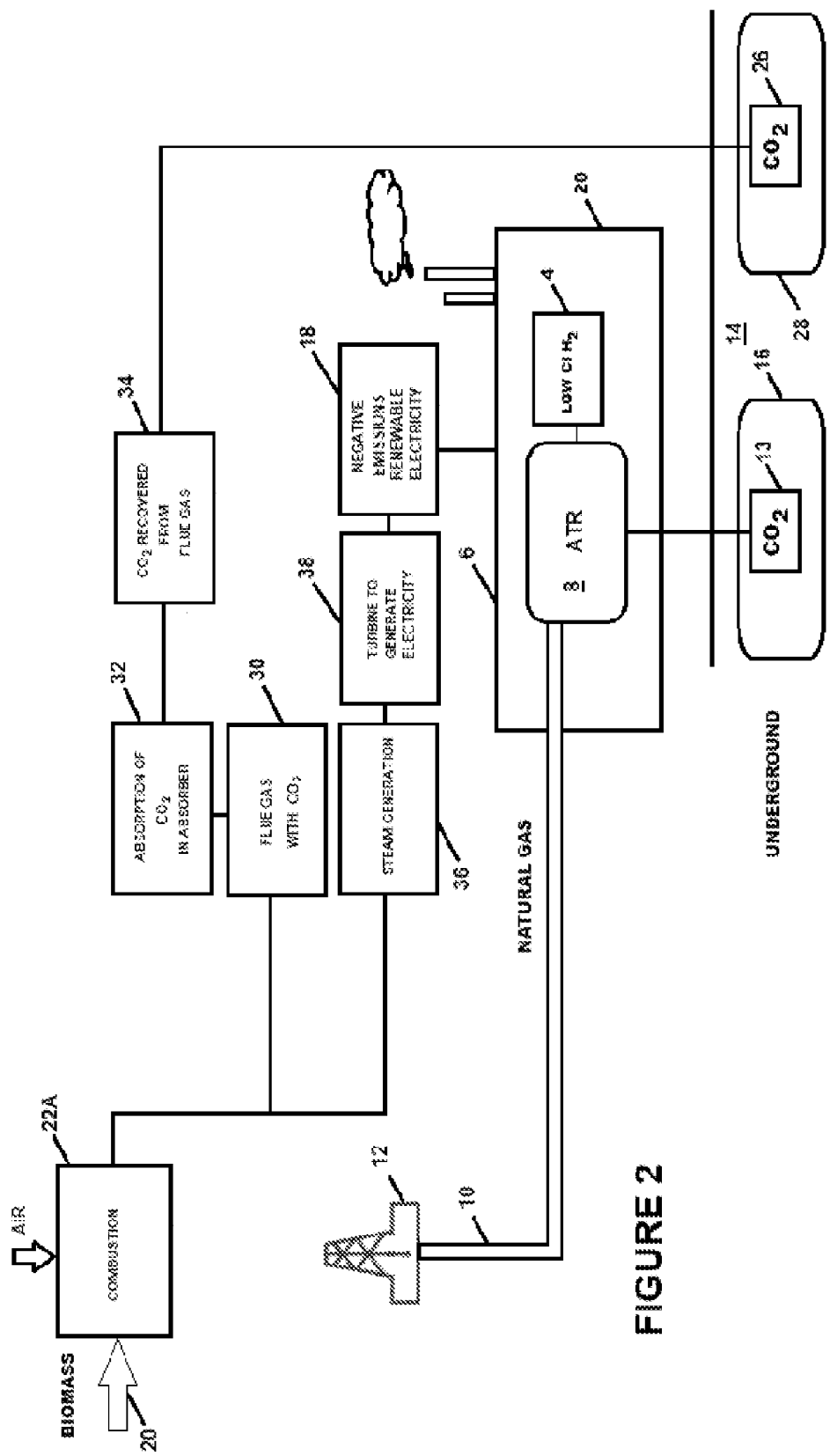
FIG. 2 describes an embodiment of a process for producing low carbon intensity (CI) hydrogen in a blue hydrogen production facility, the process comprising using renewable electricity. The renewable electricity is derived from combustion of biomass in which carbon dioxide derived from the biomass is used for CCS.

FIG. 2 depicts a flow diagram for obtaining low CI hydrogen 4 from a blue hydrogen production facility 6 in which the carbon negative renewable electricity 18 results from biomass combustion and carbon capture and sequestration of CO$_2$ from a flue gas. As described in connection with FIG. 1, the process in this exemplary flow diagram comprises reforming natural gas 10 derived from a fossil source (e.g., oil well 12) in an ATR unit 8 and fossil CO$_2$ 13 derived from the non-renewable gaseous feedstock and produced at the blue hydrogen production facility 6 is captured and sequestered underground 14 in a geological formation 16.

The carbon negative renewable electricity 18 is derived from the combustion 22A of any biomass 20 (e.g., raw biomass, processed biomass, including biogas from anaerobic digestion). This could include co-firing where solid biomass and coal are combusted together (provided the electricity still has negative emissions). As another example, biogas can be combusted to produce electricity in a simply cycle gas plant (e.g., a gas turbine connected to a generator) or a combined cycle turbine plant (simple cycle plant combined with an external combustion engine operating on the Rankine cycle).

In this embodiment, steam is generated from the combustion (steam generation 36) that is used to generate electricity via a turbine 38. The carbon negative renewable electricity 18 so produced is used as a source of power for the low CI H$_2$ 4 in the blue hydrogen production facility 6.

In addition, flue gas 30, which is a gaseous mixture comprising CO$_2$, is produced from the combustion 22A. The CO$_2$ 26 that is sequestered is recovered from the flue gas 30 (e.g., shown as by absorption in an absorber 32 that absorbs the CO$_2$ using a suitable solvent, which is typically an amine as would be appreciated by those of skill in the art). The solvent containing the CO$_2$ may be introduced to a stripper in which the solvent is regenerated. The bound CO$_2$ is desorbed by supplying heat and the CO$_2$ compressed. As would be appreciated by those of skill in the art, other methods to remove the CO$_2$ from the flue gas 30 include adsorption, cryogenic techniques or a membrane, among others. The recovered and compressed CO$_2$ 34 is placed underground 14 in a geological formation 28.

Figure 3:
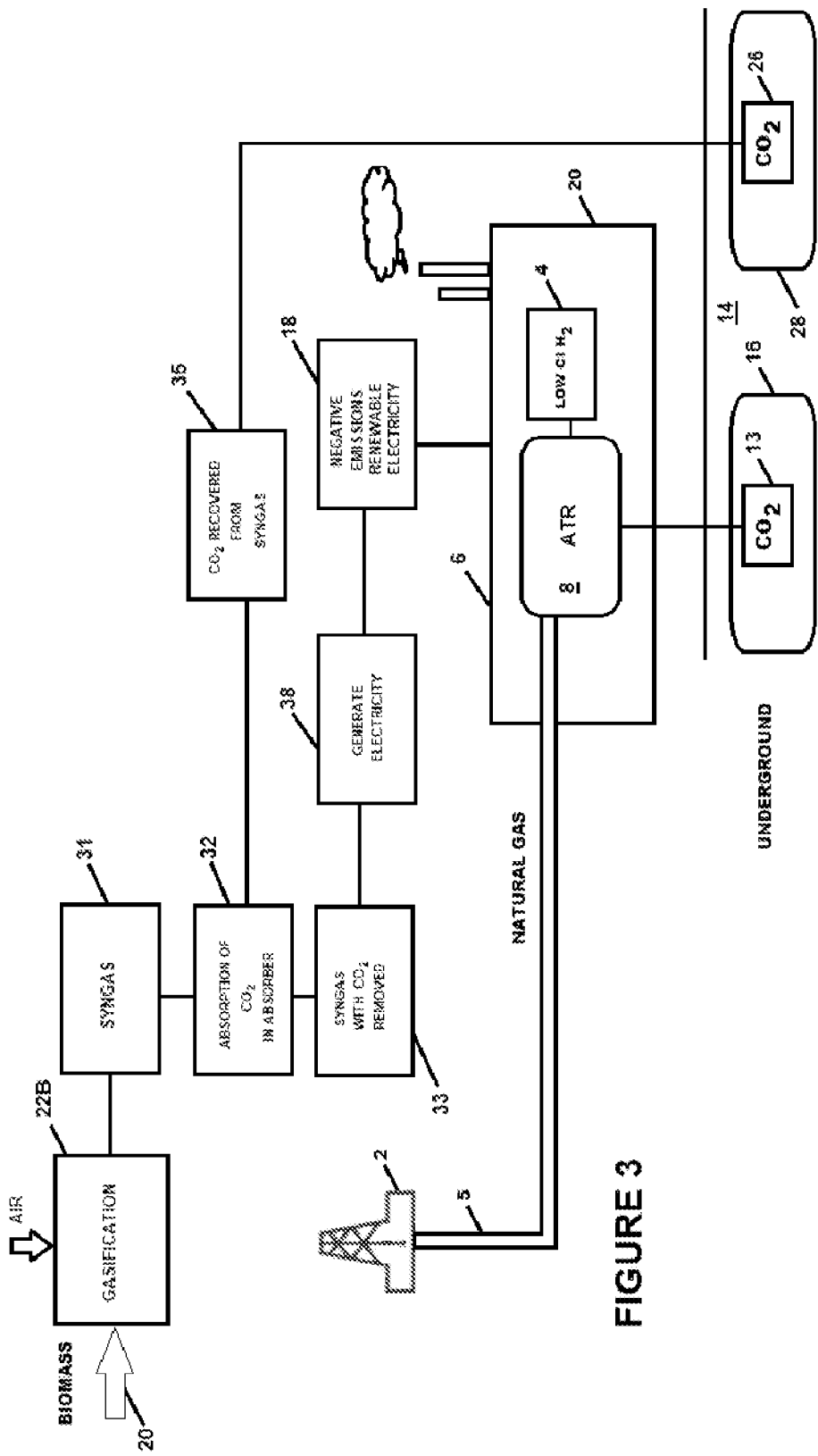
FIG. 3 describes an embodiment of a process for producing low carbon intensity (CI) hydrogen in a blue hydrogen production facility. The process in this embodiment comprises using renewable electricity derived from gasification of biomass with carbon capture and sequestration (CCS) of carbon dioxide from syngas.

FIG. 3 depicts a flow diagram for obtaining low CI hydrogen 4 from a blue hydrogen production facility 6 in which the carbon negative renewable electricity 18 results from biomass gasification 22B and carbon capture and sequestration of CO$_2$ from syngas 31. As described previously in connection with FIG. 1, the process in this exemplary flow diagram comprises hydrogen production in a blue hydrogen production facility with carbon capture and sequestration of the CO$_2$ 13.

The carbon negative renewable electricity 18 is derived from the gasification 22B of any biomass 20 (e.g., raw biomass, processed biomass, and the like). This could include co-gasification where solid biomass and coal are combusted together (provided the electricity still has negative emissions). As another example, syngas can be combusted to produce electricity in a simple cycle gas plant (e.g., a gas turbine connected to a generator) or a combined cycle turbine plant (simple cycle plant combined with an external combustion engine operating on the Rankine cycle).

In this embodiment, regardless of the biomass that is gasified, the syngas 31 produced from the gasification 22B is a gaseous syngas mixture comprising CO, H$_2$ and CO$_2$, among other gaseous components, including impurities. In this embodiment, the CO$_2$ is recovered from the syngas 31 by absorption in an absorber 32 that absorbs the CO$_2$ using a suitable solvent, which is typically an amine as would be appreciated by those of skill in the art. The content of unwanted gases can be reduced to below a desired value. Optionally, the solvent containing the CO$_2$ may be introduced to a stripper in which the solvent is regenerated. The bound CO$_2$ is desorbed by supplying heat and the CO$_2$ compressed. As would be appreciated by those of skill in the art, other methods to remove the CO$_2$ from the syngas 31 include adsorption, cryogenic techniques or a membrane, among others. In addition, or alternatively, the CO$_2$ can be recovered from a flue gas post-combustion. The recovered and compressed CO$_2$ 35 is placed underground 14 so that the $CO_2$ 26 is placed in a geological formation 28. Alternatively, or additionally, biochar produced from the gasification is provided for CCS.

The syngas with $CO_2$ removed is used to generate electricity 38. The carbon negative renewable electricity 18 so produced is used as a source of power for the low CI $H_2$ 4 in the blue hydrogen production facility 6. While FIG. 3 describes $CO_2$ capture pre-combustion, it is also possible to capture the $CO_2$ in a flue gas after the combustion of syngas (e.g., to produce steam).

Figure 4A:
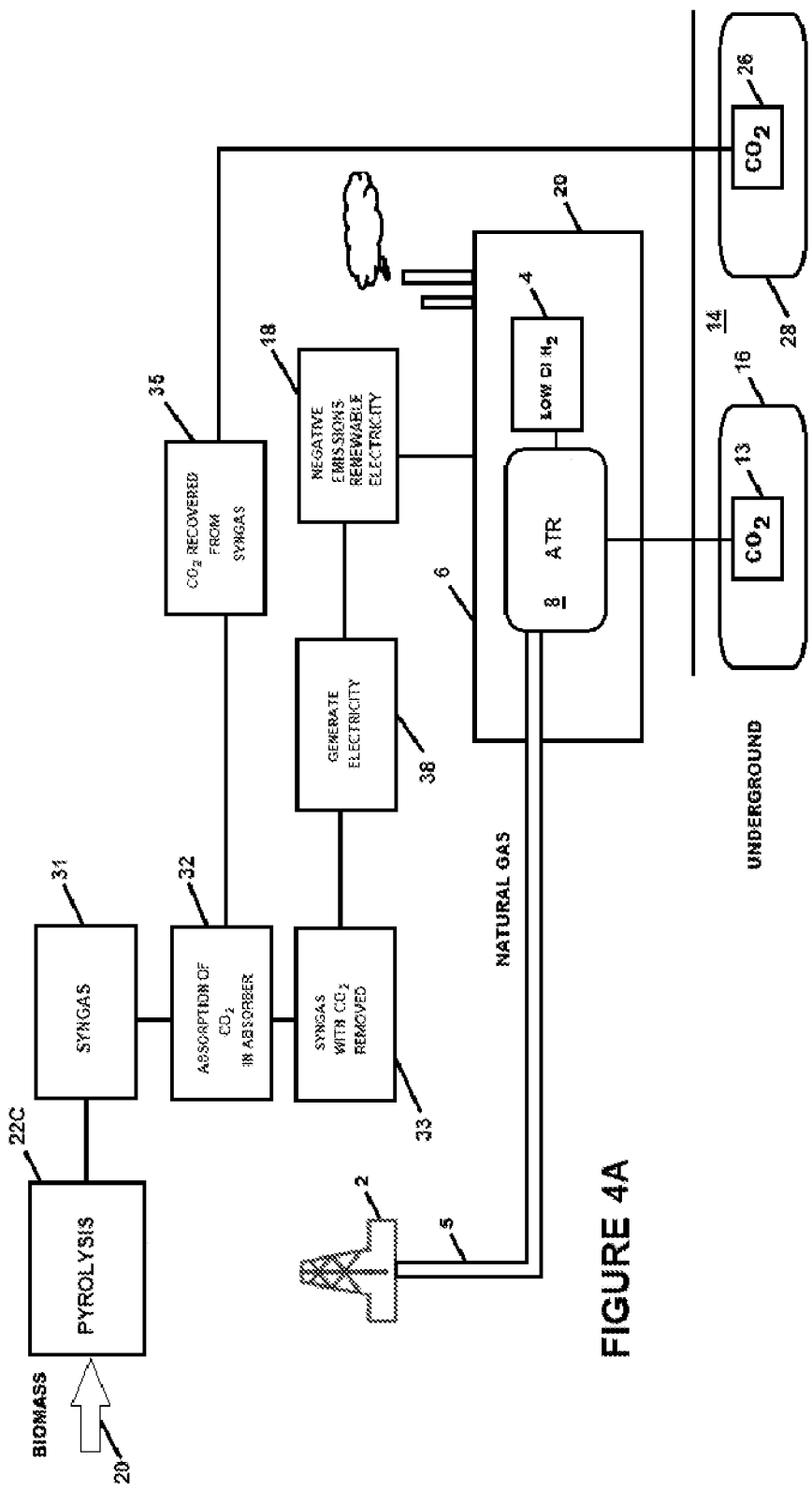
FIG. 4A describes an embodiment of a process for producing low carbon intensity (CI) hydrogen in a hydrogen production facility that is part of an oil refinery. The process in this embodiment comprises using renewable electricity derived from pyrolysis of biomass with carbon capture and sequestration (CCS) of carbon dioxide from syngas produced from the pyrolysis.

FIG. 4A is identical to FIG. 3 except the syngas 31 is produced by pyrolysis 22C of biomass 20. In pyrolysis, solid biomass is typically exposed to high temperatures (e.g., lower than gasification) without oxygen or low levels to produce syngas, bio-oil and biochar. Similar to FIG. 3, the syngas can be used to generate the carbon negative renewable electricity 18.

Figure 4B:
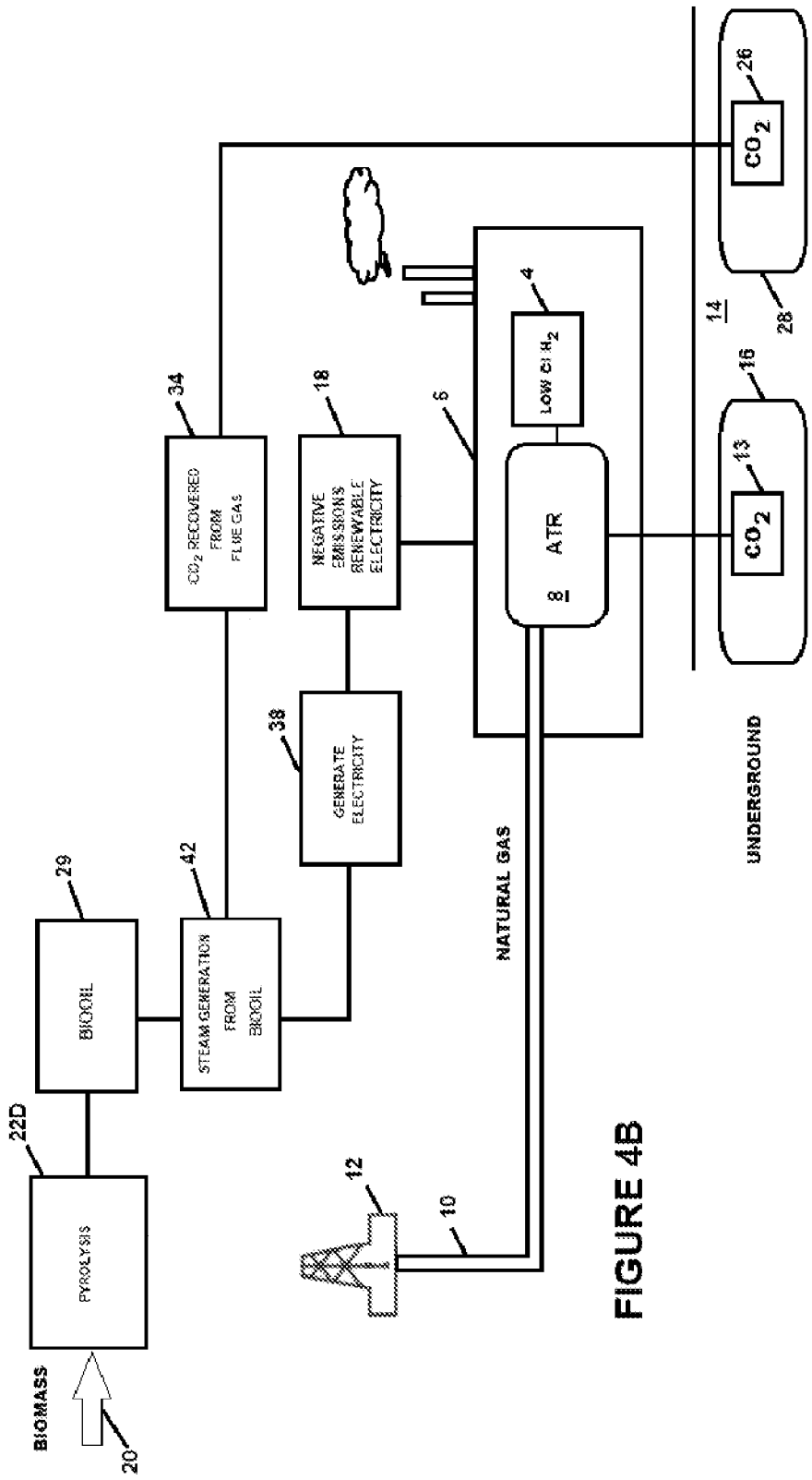
FIG. 4B describes an embodiment of a process for producing low carbon intensity (CI) hydrogen in a hydrogen production facility that is part of an oil refinery. The process in this embodiment comprises using renewable electricity derived from pyrolysis of biomass to produce biooil, with carbon capture and sequestration (CCS) of carbon dioxide from flue gas produced from burning the biooil to generate the electricity.

FIG. 4B describes pyrolysis 22D of biomass to produce biooil 29. The biooil 29 can be burned (e.g., for steam generation 42) in place of fuel oil or diesel in furnaces, turbines and/or engines for electricity production 38 to produce the carbon negative renewable electricity 18, which is used in the blue hydrogen production facility 6 to produce the low CI $H_2$. The $CO_2$ in the flue gas 34 produced post-combustion can be captured and sequestered underground 14 in the geological formation 28.

Figure 4C:
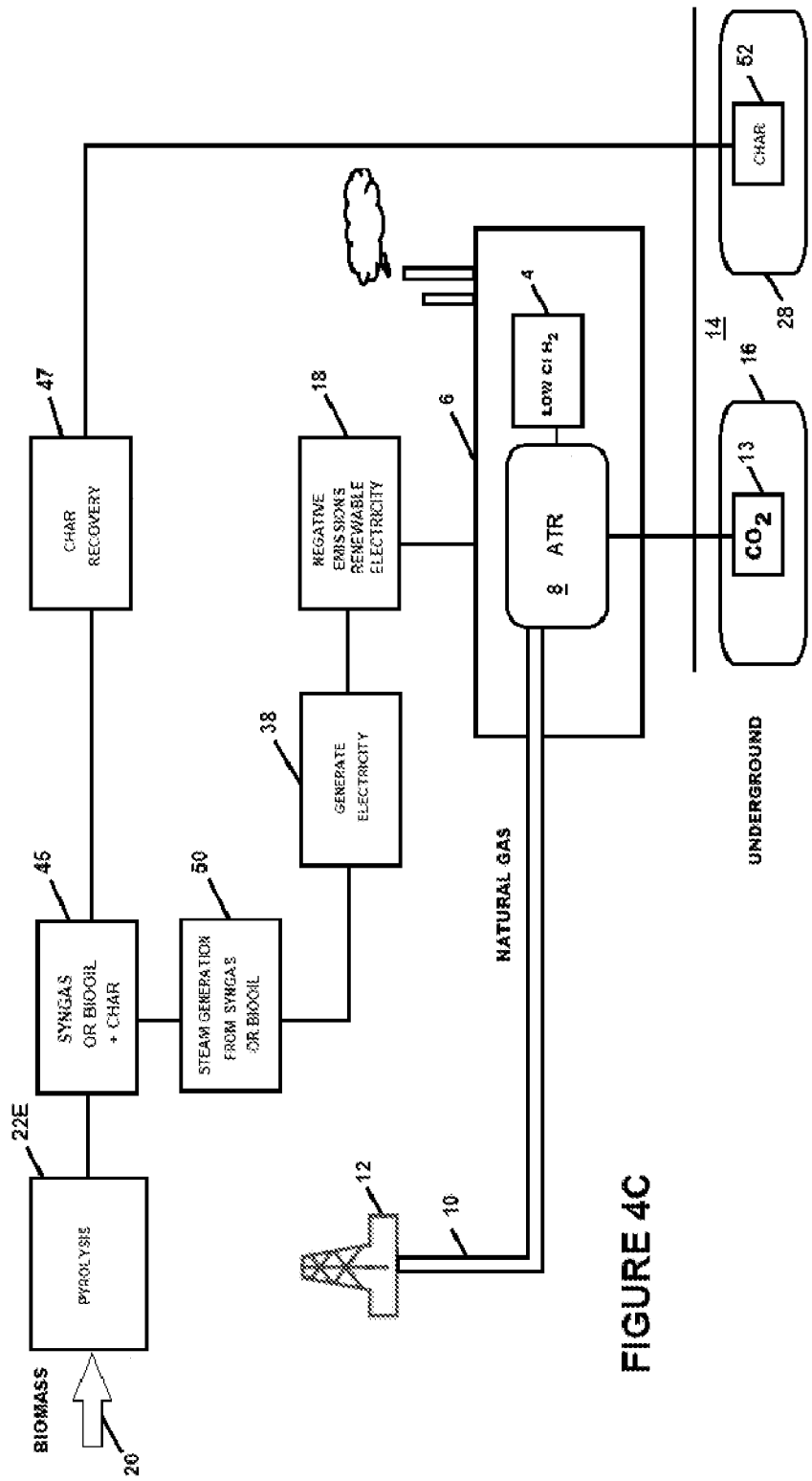
FIG. 4C describes an embodiment of a process for producing low carbon intensity (CI) hydrogen in a hydrogen production facility that is part of an oil refinery. The process in this embodiment comprises using renewable electricity derived from pyrolysis of biomass to produce syngas and/or biooil with carbon capture and sequestration (CCS) of char produced from the pyrolysis.

FIG. 4C describes pyrolysis 22E of biomass to produce syngas, biooil and char. In this example, char is captured in char recovery 47 from the pyrolysis and the recovered char 52 is sequestered (e.g., underground 14 in the geological formation). The syngas or biooil is used to generate steam 50 to drive a turbine to generate electricity 38. The resultant carbon negative renewable electricity 18 is used in the blue hydrogen production facility 6 to produce the low CI $H_2$ 4.

In certain above-described embodiments, the carbon negative renewable electricity is used in hydrogen production that includes ATR. This combination can be particularly advantageous. For example, since all or most of the carbon dioxide produced from ATR (e.g., more than 80%) can be captured from the syngas (or a stream derived from the syngas, such as purge gas from hydrogen production), the carbon capture can be more efficient (e.g., relative to from SMR). For example, in SMR, if more than 80% of the total carbon dioxide produced from hydrogen production is to be captured, then typically, at least some of the carbon dioxide will have to be captured from the flue gas. Capturing carbon dioxide from flue gas is generally less efficient than capturing carbon dioxide from syngas, which typically is at a higher pressure and has a higher concentration of carbon dioxide. In some embodiments, at least 80%, at least 85%, or at least 90% of the carbon dioxide generated during ATR is captured from the syngas or stream derived therefrom. In capturing a larger percentage of the carbon dioxide, the carbon intensity of the resulting blue hydrogen can be relatively low (e.g., 5.75 $kgCO_2e/kgH_2$), but is unlikely to be low enough to meet a target carbon intensity between about 0.45 and about 4 $kgCO_2e/kgH_2$. However, since ATR can require a relatively large amount of electricity (e.g., relative to SMR), a relatively large amount of carbon negative renewable electricity can be used to reduce the carbon intensity of the resulting hydrogen to the extent that it can meet a target carbon intensity of about 0.45 $kgCO_2e/kgH_2$. In each of the foregoing examples, the biomass can be supplemented with fossil material provided that the low CI $H_2$ meets the target.

The example below is merely exemplary and should not be construed as limiting to the scope of the disclosure as defined by the claims.

EXAMPLES

Example 1: Surprising Reductions in CI of Hydrogen Produced in a Blue Hydrogen Production Facility Using Biomass Derived Renewable Electricity with CCS This example demonstrates that the use of renewable electricity derived from biomass and produced from a process with CCS in a blue hydrogen production facility provides surprising reductions in the CI of the hydrogen. In fact, the inventor has found that the use of such biomass-derived renewable electricity with CCS in a blue hydrogen production facility can decrease the CI of hydrogen produced by ten times or more relative to the more conventional solar or wind green power sources.

The calculations are set forth below and compare the CI of hydrogen production in the following three cases:

Case A. Inventive example—renewable electricity using the renewable electricity produced by biomass with CCS in a blue hydrogen production facility;

Case B. Conventional renewable electricity using renewable electricity from conventional sources (solar or wind) in a blue hydrogen production facility; and Case C. Fossil electricity baseline using conventional electricity from fossil sources in a blue hydrogen production facility.

Referring again to FIG. 1 (described previously), the GHG emissions associated with each case above can be divided into the following three blocks:

Block 1: net GHG emissions from the hydrogen production facility;

Block 2: net GHG emissions (+ or −) from the generation of electricity used in the hydrogen production facility; and Block 3: GHG emissions from the production and delivery of the natural gas used in the hydrogen production facility.

As will be apparent to those of skill in the art, the three Cases A, B and C above differ only in the emissions associated with Block 2, namely the generation of electricity used in the hydrogen production facility.

The CI values of hydrogen for Cases 1, 2 and 3 were determined using published data from regulators. Baseline emissions (Case C) are calculated using the 2022 NETL analysis with an ATR-based blue hydrogen production facility as the baseline case. See Lewis et al., 2022 Apr. 14, National Energy Technology Laboratory (NETL), Report No. DOE/NETL-2022/3241, available at www.osti.gov/biblio/1862910, which is incorporated herein by reference. For Case B (conventional green electricity), the carbon intensity from the use of electricity from solar or wind sources are removed as they are assumed to be near zero. For Case A (example of inventive process), the renewable electricity is produced by combustion of biomass with post-combustion CCS (e.g., see FIG. 2 flowsheet). The CI calculations were based on the CI of a bio-power plant (using woody biomass) with CCS using NREL assumptions, which in this case approximates CI values determined by GREET 2022. See Denholm, Paul, Patrick Brown, Wesley Cole, et al. 2022. Examining Supply-Side Options to Achieve 100% Clean Electricity by 2035. Golden, CO: National Renewable Energy Laboratory. NREL/TP6A40-81644. www.nrel.gov/ docs/fy22osti/81644.pdf, which is incorporated herein by reference. GREET 2022 figures were used for carbon intensities of feedstocks. See Wang et al., 2022 Oct. 10, Greenhouse gases, Regulated Emissions, and Energy use in Technologies Mode (2022.Net), www.osti.gov/doecode/biblio/81029, which is incorporated herein by reference.

(i) Baseline Case C CI Value

The calculated combined CI of the Baseline Case C in a blue hydrogen production facility without the use of renewable electricity is 5.75 kgCO2e/kgH$_2$ CI. The calculations are set forth below. This value does not meet some regulatory targets. For example, a target CI for the U.S. Inflation Reduction Act (IRA) can be within the range from 0.45-4 kgCO$_2$e/kgH$_2$ and the CI value exceeds this range.

The baseline Case C assumes that the blue hydrogen production facility uses ATR and reduces 94.5% of the facility's CO$_2$ emissions. This reduces the Block 1 emissions to 0.65 kgCO$_2$e/kgH$_2$. This includes 0.51 kgCO$_2$e/kgH$_2$ stack emissions and 0.14 kgCO$_2$e/kgH$_2$ emissions from CO$_2$ for transport and storage. The Block 2 emissions (electricity from grid) are 2.4 kgCO$_2$e/kgH$_2$. The net power consumption was estimated to be about 4 kWh/kgH$_2$, with a typical grid CI of about 0.6 kgCO$_2$e/kWh. The Block 3 emissions, primarily from natural gas are 2.7 kgCO$_2$e/kgH$_2$.

The performance summary and environmental profile for the baseline Case C is set forth in Table 1 below:

TABLE 1

Performance summary and environmental profile for hydrogen production baseline with autothermal reforming (ATR)

| Case name/units | Reforming with ATR |
|---|---|
| CO$_2$ capture | 94.5% |
| Capacity Factor | 90% |
| Hydrogen Production Rate (lb/hr) | 60,627 |
| Gross Power Output (Mwe) | 0 |
| Auxiliary Power Requirement (MWe) | 110 |
| Net power output (MWe) | −110 |
| Coal Flowrate (lb/hr) | N/A |
| Biomass Flowrate (lb/hr) | N/A |
| Natural Gas Flowrate (lb/hr) | 213,694 |

(ii) Comparison of Case B Using Renewable Electricity from Wind or Solar and Case C Using the Inventive Disclosure with Biomass Electricity Combined with CCS The CI value for Case B using renewable electricity from wind and solar is 3.35 kgCO$_2$e/kgH$_2$. By contrast, the Case C inventive process has a CI that is significantly lower, namely 0.35 kgCO$_2$e/kgH$_2$. In other words, the CI reductions achieved by an embodiment of the disclosure surprisingly approach 10 times (9.57×) that of Case B using renewable electricity from wind and solar. The calculations for each case are set forth below.

The carbon emission values for the Case B scenario with renewable electricity from wind or solar and Case C scenario (example of inventive disclosure) are summarized in Table 2 below:

TABLE 2

Comparison of CI contributions and values between example of inventive process, baseline and the use of conventional renewable electricity from wind or solar

| GHG contribution | Case A (baseline) | Case B (wind or solar electricity) | Case C (example of inventive process with biomass and CCS renewable electricity) |
|---|---|---|---|
| Stack | 0.51 | 0.51 | 0.51 |
| Natural gas | 2.70 | 2.70 | 2.70 |
| Grid Electricity | 2.40 | 0.00 | −3.00 |
| CO$_2$ transport and sequestration | 0.14 | 0.14 | 0.14 |
| Total CI (kgCO$_2$e/kgH$_2$) | 5.75 | 3.35 | 0.35 |

The National Renewable Energy Laboratory (NREL) estimates that for current technology the CI of bio-power plant with CCS is about −1.2 kgCO$_2$e/kWh. Replacing 75% of power in the ATR with renewable electricity from the bio-power plant with CCS reduces the CI contribution from electricity to −3.00 kgCO$_2$e/kgH$_2$ (Table 2 above). On the other hand, the renewable electricity generation from wind or solar is only 0.00 kgCO$_2$e/kgH$_2$ (Table 2).

The resulting CI of 0.35 kgCO$_{2e}$/kgH$_2$ meets most CI targets, including the above-mentioned IRA green H$_2$ target.

The above embodiments have been provided as examples only. It will be appreciated by those of ordinary skill in the art that various modifications, alternate configurations, and/or equivalents will be employed without departing from the scope of the invention. Accordingly, the scope of the invention is therefore intended to be limited solely by the scope of the appended claims.

The invention claimed is:

1. A process of obtaining hydrogen from a blue hydrogen production facility that meets a target carbon intensity (CI$_T$), the process comprising:
   reforming non-renewable gaseous feedstock;
   capturing and sequestering fossil CO$_2$ derived from the non-renewable gaseous feedstock; and
   at least partially powering the process with carbon negative renewable electricity, the carbon negative renewable electricity being derived from biomass and generated from a production process where carbon derived from the biomass is captured and sequestered,
   wherein an amount of the carbon negative renewable electricity used in the process allows a carbon intensity of the hydrogen produced therefrom to be reduced sufficiently so that the target carbon intensity (CI$_T$) is achieved,
   wherein renewable electricity produced from the production process is introduced to a fungible grid by a party that produces the renewable electricity or an intermediary thereof, and
   wherein the carbon negative renewable electricity is sourced from the fungible grid by the blue hydrogen production facility, the carbon negative renewable electricity sourced from the fungible grid having a carbon intensity corresponding to the renewable electricity introduced to the grid.

2. The process of claim 1, wherein the carbon that is derived from the biomass comprises carbon dioxide, and wherein the carbon negative renewable electricity and carbon dioxide is produced by combustion of the biomass.

3. The process of claim 1, wherein the target carbon intensity ($CI_T$) is equal to or less than 2.3 $kgCO_2e/kgH_2$.

4. The process of claim 1, wherein the target carbon intensity ($CI_T$) is equal to or less than 1 $kgCO_2e/kgH_2$.

5. The process of claim 1, wherein the target carbon intensity ($CI_T$) is equal to or less than 0.5 $kgCO_2e/kgH_2$.

6. The process of claim 1, wherein the carbon derived from the biomass comprises carbon dioxide, and wherein the carbon negative renewable electricity has negative emissions due at least in part from carbon capture and sequestration of the carbon dioxide.

7. The process of claim 1, wherein the reforming comprises autothermal reforming.

8. A process for utilizing biomass to enable a blue hydrogen production facility to meet a target carbon intensity ($CI_T$) of hydrogen produced therefrom, the process comprising:
   producing carbon negative renewable electricity using the biomass, wherein carbon derived from the biomass is captured and sequestered; and
   providing the carbon negative renewable electricity to the blue hydrogen production facility to at least partially power the blue hydrogen production the blue hydrogen production comprising:
   reforming non-renewable gaseous feedstock; and
   capturing and sequestering fossil $CO_2$ derived from the non-renewable gaseous feedstock,
   wherein an amount of the carbon negative renewable electricity used in the blue hydrogen production allows a carbon intensity of the hydrogen produced therefrom to be reduced sufficiently so that the target carbon intensity ($CI_T$) is achieved, and
   wherein the carbon negative renewable electricity is introduced to a fungible grid by a party that produces the carbon negative renewable electricity or an intermediary thereof, and
   wherein electricity is sourced from the grid by the blue hydrogen production facility, the electricity sourced from the grid having a carbon intensity corresponding to the carbon negative renewable electricity introduced to the grid.

9. The process of claim 8, wherein the carbon negative renewable electricity is produced by combustion of the biomass.

10. The process of claim 8, wherein the target carbon intensity ($CI_T$) is equal to or is less than 2.3 $kgCO_2e/kgH_2$.

11. The process of claim 8, wherein the target carbon intensity ($CI_T$) is equal to or less than 1 $kgCO_2e/kgH_2$.

12. The process of claim 8, wherein the target carbon intensity ($CI_T$) is equal to or less than 0.5 $kgCO_2e/kgH_2$.

13. A method of making low carbon intensity hydrogen, the low carbon intensity hydrogen having a carbon intensity of 2.3 $kgCO_2e/kgH_2$ or lower, the method comprising:
   a) generating hydrogen from a process comprising:
      (i) converting non-renewable feedstock to a gas mixture comprising hydrogen and carbon dioxide; and
      (ii) capturing and sequestering at least some of the carbon dioxide; and
   b) at least partially powering the process with carbon negative renewable electricity, the carbon negative renewable electricity associated with a production process wherein renewable electricity is generated from biomass and wherein at least some carbon derived from the biomass is captured and sequestered,
   wherein a carbon intensity of the hydrogen generated is 2.3 $kgCO_2e/kgH_2$ or lower, and
   wherein renewable electricity produced from the production process is introduced to a fungible grid by a party that produces the renewable electricity or an intermediary thereof and wherein the carbon negative renewable electricity is sourced from the fungible grid by the blue hydrogen production facility, the carbon negative renewable electricity sourced from the fungible grid having a carbon intensity corresponding to the renewable electricity introduced to the grid.

14. The method of claim 13, wherein the non-renewable feedstock comprises natural gas, refinery gas, or a combination thereof, and wherein (i) comprises steam methane reforming, autothermal reforming, or a combination thereof.

15. The method of claim 13, wherein the non-renewable feedstock comprises coal, fuel oil, or a combination thereof, and wherein (i) comprises partial oxidation or gasification.

16. The method according to claim 13, wherein the production process for producing the carbon negative renewable electricity comprises the use of the biomass and fossil feedstock, and wherein the production process comprises capturing and sequestering carbon derived from the fossil feedstock.

* * * * *